(12) United States Patent
Shen et al.

(10) Patent No.: US 10,776,709 B2
(45) Date of Patent: Sep. 15, 2020

(54) GENERALIZED QUANTUM CHANNELS

(71) Applicant: Yale University, New Haven, CT (US)

(72) Inventors: Chao Shen, Harrison, NJ (US); Kyungjoo Noh, New Haven, CT (US); Victor V. Albert, New Haven, CT (US); Stefan Krastanov, New Haven, CT (US); Michel Devoret, New Haven, CT (US); Robert J. Schoelkopf, III, Madison, CT (US); Steven M. Girvin, Hamden, CT (US); Liang Jiang, Guilford, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 16/348,131

(22) PCT Filed: Nov. 10, 2017

(86) PCT No.: PCT/US2017/061181
§ 371 (c)(1),
(2) Date: May 7, 2019

(87) PCT Pub. No.: WO2018/089850
PCT Pub. Date: May 17, 2018

(65) Prior Publication Data
US 2019/0266512 A1 Aug. 29, 2019

Related U.S. Application Data

(60) Provisional application No. 62/420,174, filed on Nov. 10, 2016.

(51) Int. Cl.
*G06N 10/00* (2019.01)
*B82Y 10/00* (2011.01)
(Continued)

(52) U.S. Cl.
CPC .............. *G06N 10/00* (2019.01); *B82Y 10/00* (2013.01); *H04B 10/70* (2013.01); *H01P 7/08* (2013.01)

(58) Field of Classification Search
CPC ......... G06N 10/00; B82Y 10/00; H04B 10/70
See application file for complete search history.

(56) References Cited

U.S. PATENT DOCUMENTS 6,578,018 B1  6/2003  Ulyanov
6,635,898 B2  10/2003  Williams et al.
(Continued)

FOREIGN PATENT DOCUMENTS

CN  1991558 A   7/2007
CN  101076957 A  11/2007
(Continued)

OTHER PUBLICATIONS

Extended European Search Report dated Oct. 5, 2018 in connection with European Application No. 16756442.6.
(Continued)

*Primary Examiner* — Sibin Chen
(74) *Attorney, Agent, or Firm* — Wolf, Greenfield & Sacks, P.C.

(57) ABSTRACT

According to some aspects, a quantum information system is provided that includes an ancilla qubit; a qudit coupled to the ancilla qubit, a detector configured to generate a detection result based on a quantum state of the ancilla qubit, and a driving source coupled to the qudit and the ancilla qubit and configured to apply at least one qudit driving signal to the qudit based on the detection result and at least one qubit driving signal to the qudit based on the detection result.

18 Claims, 10 Drawing Sheets

(51) Int. Cl.
*H04B 10/70* (2013.01)
*H01P 7/08* (2006.01)

(56) References Cited

U.S. PATENT DOCUMENTS

| | | | |
|---|---|---|---|
| 6,943,368 | B2 | 9/2005 | Amin et al. |
| 7,230,266 | B2 | 6/2007 | Hilton et al. |
| 7,498,832 | B2 | 3/2009 | Baumgardner et al. |
| 7,899,092 | B2 | 3/2011 | Malinovsky |
| 8,106,717 | B2 | 1/2012 | Ichimura et al. |
| 8,138,784 | B2 | 3/2012 | Przybysz et al. |
| 8,242,799 | B2 | 8/2012 | Pesetski et al. |
| 8,508,280 | B2 | 8/2013 | Naaman et al. |
| 8,514,478 | B1 | 8/2013 | Spence |
| 2002/0188578 | A1 | 12/2002 | Amin et al. |
| 2004/0109631 | A1 | 6/2004 | Franson et al. |
| 2004/0119061 | A1 | 6/2004 | Wu et al. |
| 2004/0200949 | A1 | 10/2004 | Beausoleil et al. |
| 2005/0240311 | A1 | 10/2005 | Rabitz |
| 2006/0017992 | A1 | 1/2006 | Beausoleil, Jr. et al. |
| 2006/0056631 | A1 | 3/2006 | Beausoleil et al. |
| 2009/0033369 | A1 | 2/2009 | Baumgardner et al. |
| 2012/0002968 | A1 | 1/2012 | Luo et al. |
| 2012/0319085 | A1 | 12/2012 | Gambetta et al. |
| 2012/0319684 | A1 | 12/2012 | Gambetta et al. |
| 2013/0196855 | A1 | 8/2013 | Poletto et al. |
| 2013/0308956 | A1 | 11/2013 | Meyers et al. |
| 2014/0266406 | A1 | 9/2014 | Abraham et al. |
| 2014/0314419 | A1 | 10/2014 | Paik |
| 2015/0263736 | A1* | 9/2015 | Herr .................. H03K 3/38 326/4 |
| 2016/0077168 | A1* | 3/2016 | Teklemariam ......... G01N 24/08 324/313 |
| 2016/0233965 | A1 | 8/2016 | Medford |
| 2016/0308502 | A1 | 10/2016 | Abdo et al. |
| 2016/0364653 | A1 | 12/2016 | Chow et al. |
| 2017/0018312 | A1* | 1/2017 | Benjamin .............. G06N 10/00 |
| 2017/0193388 | A1 | 7/2017 | Filipp et al. |
| 2017/0201224 | A1 | 7/2017 | Strong et al. |
| 2018/0032895 | A1 | 2/2018 | Jiang et al. |
| 2018/0247217 | A1 | 8/2018 | Heeres et al. |
| 2019/0087743 | A1 | 3/2019 | Heeres et al. |

FOREIGN PATENT DOCUMENTS

| | | |
|---|---|---|
| CN | 101990742 A | 3/2011 |
| CN | 102210908 A | 10/2011 |
| CN | 102593694 A | 7/2012 |
| CN | 103998965 A | 8/2014 |
| EP | 2 797 038 A2 | 10/2014 |
| JP | 2007-524815 A | 8/2007 |
| WO | WO 2008/140290 A2 | 11/2008 |
| WO | WO 2016/138378 A1 | 9/2016 |
| WO | WO 2016/138399 A1 | 9/2016 |
| WO | WO 2017/151200 A1 | 9/2017 |
| WO | WO 2018/089850 A1 | 5/2018 |

OTHER PUBLICATIONS

International Search Report and Written Opinion for International Application No. PCT/US2016/019769 dated May 5, 2016.
International Preliminary Report on Patentability for International Application No. PCT/US2016/019769 dated Sep. 8, 2017.
Extended European Search Report for European Application No. 16756458.2 dated Nov. 12, 2018.
International Search Report and Written Opinion for International Application No. PCT/US2016/019807 dated May 2, 2016.
International Preliminary Report on Patentability for International Application No. PCT/US2016/019807 dated Sep. 8, 2017.
Extended European Search Report for European Application No. 16855886.4, dated Feb. 22, 2019.
International Search Report and Written Opinion for Application No. PCT/US2016/043514 dated May 23, 2017.
International Preliminary Report on Patentability for Application No. PCT/US2016/043514 dated Feb. 8, 2018.
Invitation to Pay Additional Fees for International Application No. PCT/US2017/061181 dated Dec. 22, 2017.
International Search Report and Written Opinion for International Application No. PCT/US2017/061181 dated Feb. 23, 2018.
Aharonov et al., Phase Change During a Cyclic Quantum Evolution, Phys. Rev. Lett. Apr. 20, 1987;58(16):1593-6.
Albert et al., Symmetries and conserved quantities in Lindblad master equations. Phys. Rev. A. Feb. 21, 2014;89(2):022118-1-14.
Andersson et al., Binary search trees for generalized measurements. Phys. Rev. A. May 6, 2008;77(5):052104-1-5.
Barreiro et al., An Open-System Quantum Simulator with Trapped Ions. Nature. Feb. 24, 2011;470:486-91.
Beige et al., Quantum Computing Using Dissipation to Remain in a Decoherence-Free Subspace. Phys. Rev. Lett. Aug. 21, 2000;85(8):1762-5.
Bianchetti et al., Dynamics of dispersive single qubit read-out in circuit quantum electrodynamics Phys. Rev. A. Oct. 30, 2009;80(4):043840-1-7.
Blais et al., Cavity quantum electrodynamics for superconducting electrical circuits:An architecture for quantum computation. Phys. Rev. A. Jun. 29, 2004;69(6):062320-1-14.
Brattke et al., Generation of Photon Number States on Demand via Cavity Quantum Electrodynamics Phys. Rev. Lett. Apr. 16, 2001;86(16):3534-7.
Braunstein et al., Quantum information with continuous variables. Rev. Mod. Phys. Apr. 2005;77, 513-77.
Burgath et al., Non-Abelian phases from quantum Zeno dynamics Phys. Rev. A. Oct. 9, 2013;88(4), 042107-1-5.
Cacheffo et al., Quasi-perfect state transfer in a bosonic dissipative network. J. Phys. B:At. Mol. Opt. Phys. May 5, 2010;43(10):105503.
Cafaro et al., Quantum stabilizer codes embedding qubits into qudits. Phys. Rev. A. Aug. 2012;86(2):022308.
Carollo et al., Coherent quantum evolution via reservoir driven holonomy. Phys. Rev. Lett. Jan. 20, 2006;96(2):020403-1-4.
Carollo et al., Geometric phase induced by a cyclically evolving squeezed vacuum reservoir. Phys. Rev. Lett. Apr. 21, 2006;96(15):150403-1-4.
Chaturvedi et al., Berry's phase for coherent states. J. Phys. A:Math. Gen. Nov. 11, 1987;20(16):L1071-5.
Choi, Completely positive linear maps on complex matrices. Linear Algebra and Its Applications. Jun. 1, 1975;10(3):285-90.
Dasgupta et al., Decoherence-induced geometric phase in a multi-level atomic system. J. Phys. B:At. Mol. Opt. Phys. May 14, 2007;40(9):S127.
De Oliveira et al., Properties of displaced number states. Phys. Rev. A. Mar. 1, 1990;41(5):2645-52.
De Ponte et al., Relaxation- and decoherence-free subspaces in networks of weakly and strongly coupled resonators. Ann. Phys. Sep. 2007;322(9):2077-84.
De Ponte et al., State protection under collective damping and diffusion. Phys. Rev. A. Jul. 26, 2011;84(1):012331-1-5.
De Ponte et al., Storing quantum states in bosonic dissipative networks. J. Phys. B:At. Mol. Opt. Phys. Nov. 14, 2008;41(21):215506.
Deléglise et al., Reconstruction of non-classical cavity field states with snapshots of their decoherence. Nature. Sep. 25, 2008;455(7212):510-4.
Devoret et al., Superconducting Circuits for Quantum Information:An Outlook. Science. Mar. 8, 2013;339(6124):1169-74.
Divincenzo, Quantum Computation. Science. Oct. 13, 1995;270(5234):255-61.
Dodonov et al., Even and Odd Coherent States and Excitations of a Singular Oscillator. Physica. Mar. 15, 1974;72(3):597-615.
Duan et al., Preserving coherence in quantum computation by pairing the quantum bits. Phys. Rev. Lett. Sep. 8, 1997;79(10):1953-6.
Facchi et al., Quantum Zeno Subspaces. Physical Review Letters. Aug. 19, 2002;89(8):080401-1-4.
Feng et al., Geometric Entangling Gates in Decoherence-Free Subspaces with Minimal Requirements. Phys. Rev Lett. Nov. 13, 2009;103(20):200501-1-4.

(56) References Cited

OTHER PUBLICATIONS

Fouquieres et al., Second order gradient ascent pulse engeineering. J. Mag. Res. Oct. 2011;212(2):412-7.
Gambetta et al., Qubit-photon intereactions in a cavity:Measurement-induced dephasing and number splitting. Phys. Rev. A. Oct. 17, 2006;74(4):042318-1-14.
Gorini et al., Completely positive dynamical semigroups of N-level systems. J. Math. Phys. May 1976;17(5):821-5.
Gottesman et al., Encoding a qubit in an oscillator. Phys. Rev. A. Jul. 2001;64(1):012310-1-21.
Heeres et al., Cavity State Manipulation Using Photon-Number Selective Phase Gates. Phys Rev Lett Sep. 25, 2015;115(13):137002-1-5. arXiv:1503.01496v1.
Hofheinz et al., Generation of Fock states in a superconducting quantum circuit. Nature. Jul. 17, 2008;454(7202):310-4.
Hofheinz et al., Synthesizing arbitrary quantum states in a superconducting resonator. Nature. May 28, 2009;459(7246):546-9.
Houck et al., Generating single microwave photons in a circuit. Nature. Sep. 20, 2007;449(7160):328-31.
Johnson et al., Quantum non-demolition detection of single microwave photons in a circuit. Nature Phys. Jun. 20, 2010;6:663-7.
Kapit, Error-Transparent Quantum Gates for Small Logical Qubit Architectures. Physical Review Letters. Feb. 1, 2018;120(5):050503-1-5.
Kempe et al., Theory of decoherence-free fault-tolerant universal quantum computation. Phys. Rev. A. Apr. 2001;63(4):042307-1-29.
Kirchmair et al., Observation of quantum state collapse and revival due to the single-photon Kerr effect. Nature. Mar. 14, 2013;495(7440):205-9.
Knill et al., Theory of Quantum Error Correction for General Noise. Phys. Rev, Lett. Mar. 13, 2000;84(11):2525-8.
Krastanov et al., Universal Control of an Oscillator with Dispersive Coupling to a Qubit. Phys. Rev. A. Oct. 21, 2015;92(4):040303-1-5.
Lanyon et al., Universal Digital Quantum Simulation with Trapped Ions. Science. Oct. 7, 2011;334(6052):57-61.
Law et al., Arbitrary Control of a Quantum Electromagnetic Field. Phys. Rev. Lett. Feb. 12, 1996;76(7):1055-8.
Leek et al., Observation of Berry's Phase in a Solid-State Qubit. Science. Dec. 21, 2007;318(5858):1889-92.
Leghtas et al., Confining the state of light to a quantum manifold by engineered two-photon loss. Science. Feb. 20, 2015;347(6224):853-7.
Leghtas et al., Deterministic protocol for mapping a qubit to coherent state superpositions in a cavity. Phys. Rev. A. Apr. 15, 2013;87(4):042315-1-7.
Leghtas et al., Hardware-Efficient Autonomous Quantum Memory Protection. Phys Rev Lett. Sep. 20, 2013;111(12):120501-1-5.
Leibfried et al., Quantum dynamics of single trapped ions. Rev. Mod. Phys. Jan. 2003;75(1):281-324.
Liang et al., Nonadiabatic holonomic quantum computation in decoherence-free subspaces with trapped ions. Phys. Rev. A. Jun. 10, 2014;89(6):062312-1-5.
Lidar et al., Decoherence Free Subspaces for Quantum Computation. Phys. Rev. Lett. Sep. 21, 1998;81(12):2594-7.
Lindblad, On the Generators of Quantum Dynamical Semigroups. Commun. Math. Phys. Jun. 1976;48(2):119-30.
Lloyd et al., Quantum Computation over Continuous Variables. Phys. Rev. Lett. Feb. 22, 1999;82(8):1784-7.
Michael et al., New Class of Quantum Error-Correcting Codes for Bosonic Mode, Phys. Rev. X. Jul.-Sep. 2016:6(3):031006-1-26.
Mirrahimi et al., Dynamically protected cat-qubits:a new paradigm for universal quantum computation. New Journal of Physics. Apr. 2014;16(4):045014. doi:10.1088/1367-2630/16/4/045014. 30 pages.
Mischuck et al., Qudit quantum computation in the Jaynes-Cumming model. Phys. Rev. A. Feb. 2013;87(2):022341-1-14.
Mousolou et al., Universal non-adiabatic holonomic gates in quantum dots and single-molecule magnets. New J. Phys. Jan. 17, 2014;16:013029.

Neto et al., From decoherence-free channels to decoherence-free and quasi-free subspaces within bosonic dissipative networks. J. Phys. B:At. Mol. Opt. Phys. Jul. 5, 2011;44(14):145502.
Nigg et al., Quantum computations on a topolgically encoded qubit. Science. Jul. 18, 2014;345(6194):302-5.
Ofek et al., Extending the lifetime of a quantum bit with error correction in superconducting circuits. Nature. Aug. 2016;536(7617):441.
Oreshkov et al., Adiabatic Markovian Dynamics Phys. Rev. Lett. Jul. 30, 2010;105(5):050503.
Oreshkov et al., Fault-Tolerant Holonomic Quantum Computation. Phys. Rev. Lett. Feb. 20, 2009;102(7):070502-1-4.
Osaki et al., Derivation and physical interpretation of the optimum detection operators for coherent-state signals. Phys. Rev. A. Aug. 1996;54(2):1691-1701.
Pachos et al., Decoherence-free dynamical and geometrical entangling phase gates. Phys. Rev. A Mar. 26, 2004;69(3):033817-1-9.
Palomaki et al., Coherent state transfer between itinerant microwave fields and a mechanical oscillator. Nature. Mar. 14, 2013. 495(7440):210-4.
Paz-Silva et al., Zeno effect for quantum computation and control. Physical Review Letters. Feb. 24, 2012;108(8):080501-1-5.
Poyatos et al., Quantum Reservoir Engineering with Laser Cooled Trapped Ions. Phys. Rev. Lett. Dec. 2, 1996;77(23):4728-31.
Reagor et al., Reaching 10 ms single photon lifetimes for superconducting aluminum cavities. Appl. Phys. Lett. May 13, 2013:102(19):192604.
Recati et al., Holonomic quantum computation with neutral atoms. Physical Review A. Sep. 17, 2002;66(3):032309-1-13. doi:10.1103/PHYSREV A.66.032309. 14 pages.
Reiserer et al., A quantum gate between a flying optical photon and a single trapped atom. Nature. Apr. 10, 2014;508(7495):237-40.
Rosenblum et al., Fault-tolerant measurement of a quantum error syndrome. Science. Jul. 20, 2018;361(6399):266-70.
Salathe et al., Digital Quantum Simulation of Spin Models with Circuit Quantum Electrodynamics Phys. Rev. X 5. Apr.-Jun. 2015;5(2):021027-1-12.
Sarandy et al., Abelian and non-Abelian geometric phases in adiabatic open quantum systems. Phys. Rev. A. Jun. 5, 2006;73(6):062101-1-10.
Schindler et al., Quantum simulation of open-system dynamical maps with trapped ions. Nat. Phys. May 19, 2013;9:361-7.
Schoelkopf et al., Wiring up quantum systems. Nature. Feb. 7, 2008;451(7179):664-9.
Schuster et al., Resolving photon number states in a superconducting circuit. Nature Letters. Feb. 1, 2007;445:515-8.
Shankar et al., Autonomously stabilized entanglement between two superconducting quantum bits. Nature. Dec. 19, 2013;504(7480):419-22.
Shen et al., Quantum channel construction with circuit quantum electrodynamics. Phys Rev B. Apr. 1, 2017;95(13):134501-1-14. arXiv:1611.03463
Signoles et al., Confined quantum Zeno dynamics of a watched atomic arrow. Nature Phys. Oct. 2014;10:715-9.
Sjöqvist, A new phase in quantum computation. Physics. Nov. 17, 2008;1:35.
Smolin et al., Efficient Method for Computing the Maximum-Likelihood Quantum State from Measurements with Additive Gaussian Noise. Phys. Rev. Lett. Feb. 17, 2012;108(7):070502-1-4.
Tiecke et al., Nanophotonic quantum phase switch with a single atom. Nature. Apr. 10, 2014;508(7495):241-4.
Vlastakis et al., Deterministically Encoding Quantum Information Using 100-Photon Schrodinger Cat States. Science. Nov. 1, 2013;342(6158):607-10.
Vourdas, Quantum systems with finite Hilbert space. Rep. Prog. Phys. Mar. 2004:67(3):267-320.
Wallraff et al., Strong coupling of a single photon to a superconducting qubit using circuit quantum electrodynamics Nature. Sep. 9, 2004;431(7005):162-7.
Wendin et al., Superconducting quantum circuits, qubits and computing. arXiv preprint cond-mat/0508729. Aug. 30, 2005. http://qudev.phys.ethz.ch/content/courses/QSIT08/pdfs/WendinReview.pdf, 60 pages.

(56) References Cited

OTHER PUBLICATIONS

Whitney et al., Automated generation of layout and control for quantum circuits. CF '07 Proceedings of the 4th International Conference on Computing Frontiers. May 7-9, 2007:83-94.
Wilczek et al., Appearance of Gauge Structure in Simple Dynamical Systems. Phys. Rev. Lett. Jun. 10, 1984;52(24):2111-4.
Wu et al., Holonomic Quantum Computation in Decoherence-Free Subspaces. Phys. Rev. Lett. Sep. 25, 2005;95(13):130501-1-4.
Wu et al., Time-dependent Decoherence-Free Subspace. J. Phys. A:Math. Theor. Oct. 12, 2012;45(40):405305-1-7.
Xu et al., Non-Adiabatic Holonomic Quantum Computation in Decoherence-Free Subspaces. Phys. Rev, Lett. Oct. 26, 2012;109(17):170501-1-5.
Xu et al., Universal Nonadiabatic Geometric Gates in Two-Qubit Decoherence-Free Subspaces. Sci. Rep. Oct. 29, 2014;4:6814.
Yin et al., Implementation of holonomic quantum computation through engineering and manipulating environment. Physical Review A. Dec. 18, 2007;76(6):062311-1-5. doi:10.1103/Physreva.76. 062311.
Zanardi et al., Coherent quantum dynamics in steady-state manifolds of strongly dissipative systems. Phys. Rev. Lett. Dec. 12, 2014;113(24):240406-1-5.
Zanardi et al., Geometry, robustness, and emerging unitary in dissipation-projected dynamics Phys. Rev. A. May 26, 2015;91(5):052324-1-8.
Zanardi et al., Holonomic Quantum Computation. Phys. Lett. A. Dec. 20, 1999;264(2-3), 94-9.
Zanardi et al., Noiseless Quantum Codes. Phys. Rev. Lett. Oct. 27, 1997;79(17):3306-9.
Zanardi, Stablizing Quantum Information. Phys. Rev. A. Jan. 2001;63(1):012301-1-4.
Zanardi, Virtual Quatum Subsystems. Phys. Rev. Lett. Aug. 13, 2001;87(7):077901-1-4.
Zhang et al., Physical implementation of holonomic quantum computation in decoherence-free subspaces with trapped ions. Phys. Rev. A. Sep. 13, 2006;74(3):034302-1-4.
Zhang et al., Quantum computation in noiseless subsystems with fast non-Abelian holonomies. Phys. Rev. A. Apr. 2014;89(4):042302-1-6.
Zheng, Dissipation-induced geometric phase for an atom trapped in an optical vacity. Phys. Rev. A. May 10, 2012;85(5):052106-1-5.
Zheng, Open-system geometric phase based on system-reservoir joint state evolution. Phys. Rev. A. Jun. 27, 2014;89(6):062118-1-6.
Zhu et al., Geometric quantum gates robust against stochastic control errors. Phys. Rev. A. Aug. 15, 2005;72(2):020301-1-4.
Zueco et al., Qubit-oscillator dynamics in the dispersive regime: analytical theory beyond rotating wave approximation. Physical Review A. Sep. 30, 2009;80(3):033846-1-5.
International Search Report and Written Opinion for International Application No. PCT/US2019/012440, dated Jul. 29, 2019.
International Preliminary Report on Patentability for International Application No. PCT/US2017/061181 dated May 23, 2019.
Extended European Search Report for European Application No. 17869543.3, dated Jun. 9, 2020.
Lloyd et al., Engineering quantum dynamics Phys Rev A. Dec. 10, 2001;65(1):010101.

* cited by examiner

GENERALIZED QUANTUM CHANNELS

CROSS REFERENCE TO RELATED APPLICATIONS

This application is a national stage filing under 35 U.S.C. 371 of International Patent Application Serial No. PCT/US2017/061181, filed Nov. 10, 2017, which claims the benefit under 35 U.S.C. §119(e) of U.S. Provisional Patent Application No. 62/420,174, filed Nov. 10, 2016, titled "Quantum Channel Construction with Circuit Quantum Electrodynamics," which are hereby incorporated by reference in their entireties.

STATEMENT REGARDING FEDERALLY-SPONSORED RESEARCH AND DEVELOPMENT

This invention was made with government support under 1122492 and 1609326 awarded by National Science Foundation and under W911NF-4-1-0011, W911NF-1-0563 and W911NF-15-2-0067 awarded by the United States Army Research Office and under FA9550-14-1-0052 and FA9550-15-1-0015 awarded by the United States Air Force Office of Scientific Research. The government has certain rights in the invention.

FIELD

The technology described herein relates generally to quantum information systems. Specifically, the present application is directed to systems and methods for controlling a quantum mechanical system.

BACKGROUND

Quantum information processing uses quantum mechanical properties to extend the capabilities of information processing. For example, security of information transfer may be enhanced, the amount of information encoded in a communication channel may be increased, and the number of operations required to perform certain computations may be reduced. Just as in conventional information processing where information is stored in one or more bits, quantum information may be stored in one or more quantum bits, known as "qubits." A qubit may be implemented physically in any two-state quantum mechanical system, such as photon polarization, electron spin, nuclear spin, or various properties of a superconducting Josephson junction, such as charge, energy, or the direction of a current.

Additionally, quantum information may be stored and processed using "qudits," which are quantum systems with "d" number of discrete quantum states. Qubits are a specific example of a qudit with d=2. Qudits may be implemented using a physical quantum system with multiple states, such as the multiple energy levels of a quantum oscillator.

BRIEF SUMMARY

The present application relates generally to systems and methods for controlling a quantum mechanical system.

According to some aspects, a quantum information system is provided that includes an ancilla qubit; a qudit coupled to the ancilla qubit; a detector configured to generate a detection result based on a quantum state of the ancilla qubit; and a driving source coupled to the qudit and the ancilla qubit and configured to apply at least one qudit driving signal to the qudit based on the detection result and at least one qubit driving signal to the qudit based on the detection result.

According to some embodiments, the quantum information system further includes a controller coupled to the driving source and the detector, wherein the controller is configured to: receive, from the detector, a detection signal indicative of the detection result; control the driving source to drive the qudit with the at least one qudit driving signal; and control the driving source to drive the qubit with the at least one qubit driving signal.

According to some embodiments, the controller is further configured to: obtain an indication of a desired quantum channel; determine the at least one qudit driving signal based on the indication of the desired quantum channel; and determine the at least one qubit driving signal based on the indication of the desired quantum channel.

According to some embodiments, the indication of the desired quantum channel is received from a user.

According to some embodiments, the indication of the desired quantum channel comprises a plurality of Kraus operators.

According to some embodiments, the plurality of Kraus operators form a minimal Kraus representation of the desired quantum channel.

According to some embodiments, obtaining the indication of the desired quantum channel comprises determining the plurality of Kraus operators that form the minimal Kraus representation of the desired channel from one or more other operators.

According to some embodiments, the controller is further configured to determine a plurality of joint unitary operators, each of the plurality of joint unitary operators configured to act on a joint system comprising the ancilla qubit and the qudit.

According to some embodiments, the controller is further configured to create a binary tree structure associated with the plurality of unitary operators.

According to some embodiments, the controller is further configured to determine each of the plurality of joint unitary operators based on a diagonalization of the sum of a subset of the plurality of Kraus operators that are rooted from an associated node of the binary tree structure.

According to some embodiments, the controller is further configured to determine a first qudit unitary operator, a second qudit unitary operator and a qubit unitary operator associated with and based on each of the plurality of joint unitary operators.

According to some embodiments, the controller is further configured to: determine the at least one qudit driving signal based on the first qudit unitary operator and the second qudit unitary operator; and determine the at least one qubit driving signal based on the qubit unitary operator.

According to some embodiments, the desired quantum channel comprises an initialization channel for the qudit.

According to some embodiments, the desired quantum channel comprises a stabilization channel for the qudit.

According to some embodiments, the desired quantum channel comprises a quantum error correction channel for the qudit.

According to some embodiments, wherein the desired quantum channel comprises a positive operator value measurement of the qudit.

According to some embodiments, the desired quantum channel comprises a quantum instrument channel.

According to some embodiments, the ancilla qubit is a superconducting qubit.

According to some embodiments, the ancilla qubit comprises at least on Josephson junction.

According to some embodiments, the ancilla qubit comprises a transmon qubit.

According to some embodiments, the qudit comprises a quantum oscillator.

According to some embodiments, the quantum oscillator comprises electromagnetic radiation in a cavity.

According to some embodiments, the cavity is a stripline cavity.

According to some embodiments, the cavity comprises a three-dimensional metal cavity.

According to some embodiments, the driving source comprises an electromagnetic radiation source.

According to some embodiments, the electromagnetic radiation source comprises a microwave pulse generator.

According to some embodiments, the detector comprises a read-out cavity. Some aspects are directed to a method of operating a quantum information system that includes a qudit coupled to an ancilla qubit forming a qudit-qubit system, the method comprising: applying a first unitary operation to the qudit-qubit system; generating a detection result based on a quantum state of the ancilla qubit; and applying a second unitary operation to the qudit-qubit system based on the detection result.

According to some embodiments, the method further comprises initializing the ancilla qubit before applying the first unitary operation.

According to some embodiments, the method further comprises: obtaining an indication of a desired quantum channel; determining at least one qudit driving signal based on the indication of the desired quantum channel; and determining at least one qubit driving signal based on the indication of the desired quantum channel.

According to some embodiments, the indication of the desired quantum channel is received from a user.

According to some embodiments, the indication of the desired quantum channel comprises a plurality of Kraus operators.

According to some embodiments, the plurality of Kraus operators form a minimal Kraus representation of the desired quantum channel.

According to some embodiments, obtaining the indication of the desired quantum channel comprises determining the plurality of Kraus operators that form the minimal Kraus representation of the desired channel from one or more other operators.

According to some embodiments, the method further comprises determining a plurality of joint unitary operators, each of the plurality of joint unitary operators configured to act on a joint system comprising the ancilla qubit and the qudit.

According to some embodiments, the method further comprises determining a binary tree structure associated with the plurality of unitary operators.

According to some embodiments, the method further comprises determining each of the plurality of joint unitary operators based on a diagonalization of the sum of a subset of the plurality of Kraus operators that are rooted from an associated node of the binary tree structure.

According to some embodiments, the method further comprises determining a first qudit unitary operator, a second qudit unitary operator and a qubit unitary operator associated with and based on each of the plurality of joint unitary operators. According to some embodiments, the method further comprises: determining the at least one qudit driving signal based on the first qudit unitary operator and the second qudit unitary operator; and determining the at least one qubit driving signal based on the qubit unitary operator.

According to some embodiments, the desired quantum channel comprises an initialization channel for the qudit.

According to some embodiments, the desired quantum channel comprises a stabilization channel for the qudit.

According to some embodiments, the desired quantum channel comprises a quantum error correction channel for the qudit.

According to some embodiments, the desired quantum channel comprises a positive operator value measurement of the qudit.

According to some embodiments, the desired quantum channel comprises a quantum instrument channel.

According to some embodiments, the ancilla qubit is a superconducting qubit.

According to some embodiments, wherein the ancilla qubit comprises at least on Josephson junction.

According to some embodiments, the ancilla qubit comprises a transmon qubit.

According to some embodiments, the qudit comprises a quantum oscillator.

According to some embodiments, the quantum oscillator comprises electromagnetic radiation in a cavity.

According to some embodiments, the cavity is a stripline cavity.

According to some embodiments, the cavity comprises a three-dimensional metal cavity.

According to some embodiments, the driving signal comprises an electromagnetic radiation signal.

According to some embodiments, the electromagnetic radiation signal comprises a microwave radiation signal.

According to some embodiments, the detector comprises a read-out cavity.

Some aspects are directed to least one non-transitory storage medium encoded with executable instructions that, when executed by at least one processor, cause the at least one processor to carry out a method of creating a generalized quantum channel, wherein the method comprises: obtaining a plurality of Kraus operators associated with a desired quantum channel; generating a plurality of unitary joint operations associated with a joint qudit-qubit system based on the Kraus operators; determining a first unitary joint operation of a plurality of unitary joint operations to perform on the joint qudit-qubit system; and determining two unitary qudit-only operations and one unitary qubit-only operation based on the first unitary joint operation.

According to some embodiments, obtaining the plurality of Kraus operators comprises: receiving an indication of a desired quantum channel; and determining a minimal Kraus representation of the quantum channel based on the indication.

According to some embodiments, the indication of the desired channel comprises a plurality of non-minimal Kraus operators.

According to some embodiments, the indication of the desired channel comprises a super-operator matrix, a Choi matrix, or a Jamiolkowski matrix.

According to some embodiments, the method further comprises generating a binary tree structure associated with the plurality of unitary joint operations.

According to some embodiments, each node of the binary tree structure is associated with a respective unitary joint operation of the plurality of unitary joint operations.

According to some embodiments, each leaf of the binary tree structure is associated with a Kraus operator of the desired quantum channel.

According to some embodiments, the unitary qubit-only operation is a selective number-dependent arbitrary phase operation.

The foregoing is a non-limiting summary of the invention, which is defined by the appended claims.

BRIEF DESCRIPTION OF DRAWINGS

Various aspects and embodiments are described with reference to the following drawings. The drawings are not necessarily drawn to scale. For the purposes of clarity, not every component may be labeled in every drawing. In the drawings.

DETAILED DESCRIPTION

Figure 1:
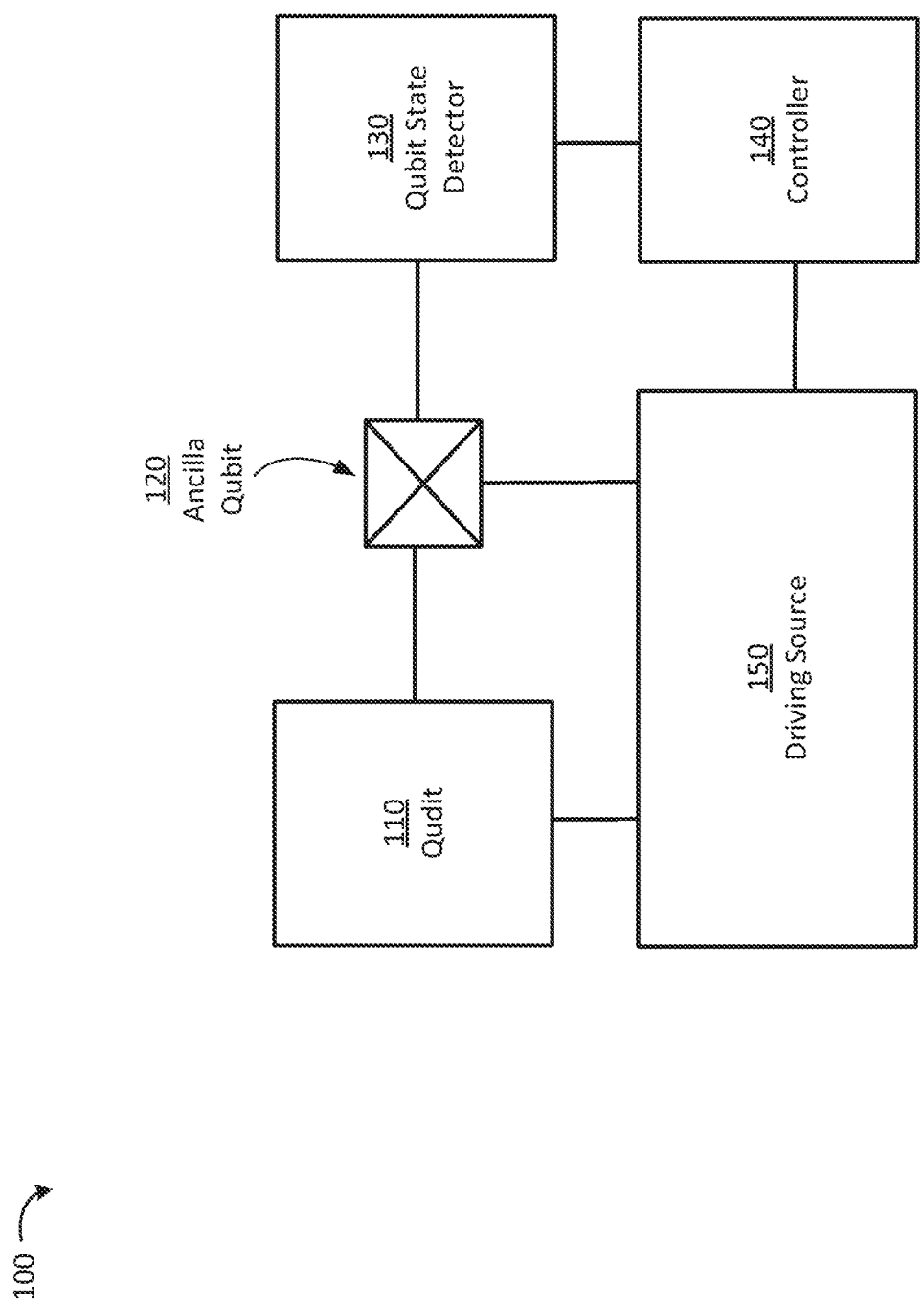
FIG. 1 is block diagram of a quantum information system, according to some embodiments.

Conventional quantum information processing schemes encode information in one or more two-level quantum systems (i.e., "qubits"). The state of a single qubit may be represented by the quantum state $|\psi\rangle$, which may be in any arbitrary superposition of the two quantum states, $|0\rangle$ and $|1\rangle$, e.g., $|\psi\rangle = \alpha|0\rangle + \beta|1\rangle$, where $\alpha$ and $\beta$ are complex numbers representing the probability amplitude of the logical qubit being in state $|0\rangle$ and $|1\rangle$, respectively.

To perform a useful quantum information process, conventional quantum information systems initialize a set of qubits to a particular quantum state, implement a set of quantum gates on the qubits, and measure the final quantum state of the qubits after performing the quantum gates. A first type of conventional quantum gate is a single-qubit gate, which transforms the quantum state of a single qubit from a first quantum state to a second quantum state. Examples of single-qubit quantum gates include the set of rotations of the qubit on a Bloch sphere. A second type of conventional quantum gate is a two-qubit gate, which transforms the quantum state of a first qubit based on the quantum state of a second qubit. Examples of two-qubit gates include the controlled NOT (CNOT) gate and the controlled phase gate. Conventional single-qubit gates and two-qubit gates unitarily evolve the quantum state of the qubits from a first quantum state to a second quantum state.

Conventional quantum information systems typically perform detections of the qubits by measuring which quantum state of a set of possible quantum states each qubit is in. This type of measurement is referred to as a projective measurement (sometimes called a projection). Examples of projective measurements include measuring the quantum state of a qubit in a particular basis to determine a detection result of either $|0\rangle$ or $|1\rangle$. Another example of a projective measurement is a measurement of the Fock basis (i.e., the photon-number eigenbasis) of a quantum oscillator. In this example, a detection result for the quantum harmonic oscillator indicates which of the infinite number of Fock states (i.e., photon-number eigenstates) $|0\rangle$, $|1\rangle$, $|2\rangle$, . . . , $|n\rangle$ the quantum oscillator is in.

The inventors have recognized and appreciated that unique and powerful quantum information processes can be implemented using a more general type of quantum operation referred to as generalized quantum channels and also known as completely positive and trace-preserving (CPTP) maps. CPTP maps include not only the unitary quantum gates and projective measurements described above, but also include nonunitary quantum state evolution and generalized quantum measurements known as positive-operator valued measures (POVMs). Additionally, CPTP maps can transform a pure quantum state $|\psi\rangle$ to a mixed state, represented by the density matrix $$\rho = \sum_i p_i |\psi_i\rangle\langle\psi_i|,$$

where i labels each pure quantum state that forms the mixed state and the coefficients $p_i$ are nonnegative and sum to one.

Previous theoretical proposals have suggested that implementing arbitrary CPTP maps for a d-dimensional system require more than one ancilla qubit and/or a circuit depth that scales poorly with the dimension, d. The inventors have, however, recognized and appreciated that any arbitrary CPTP map may be implemented for a qudit with the additional of only a single ancilla qubit and a circuit depth that is logarithmic with the dimension of the qudit. Additionally, the inventors have recognized and appreciated a technique for implementing this efficient CPTP scheme using cavity quantum electrodynamics (cQED).

Referring to FIG. 1, a quantum information system 101 used to construct a quantum channel includes a qudit 110, a single ancilla qubit 120, a qubit state detector 130 a controller 140, and a driving source 150, according to some embodiments. The ancilla qubit 120 is coupled to the qudit 110 such that the state of the qudit 110 may affect the state of the ancilla qubit 120 and vice versa. For example, the ancilla qubit 120 and the qudit 110 may be dispersively coupled—meaning that a detuning between the ancilla qubit 120 and the qudit 110 (e.g., a quantum oscillator in a cavity) is much larger (e.g., an order of magnitude larger) than the coupling strength between the ancilla qubit 120 and the qudit 110, the detuning being the frequency difference between the transition frequency of the ancilla qubit 120 and one or more supported modes of the cavity.

The qudit 110 may be any suitable d-dimensional quantum system with d quantum states. For example, the qudit 110 may include a quantum oscillator (e.g., harmonic or anharmonic). For example, the qudit may be physically implemented using a cavity that supports electromagnetic radiation, such as a stripline cavity or a three-dimensional conductive cavity (e.g., made from a metal such as aluminum). A subset of the photon number states of the oscillator may be the d quantum states of the qudit.

The ancilla qubit 120 may be any suitable two-dimensional quantum system with two quantum states. For example, the ancilla qubit may be a superconducting qubit. Examples of superconducting qubits include a superconducting charge qubit where the two quantum states relate to the charge of a superconductor, a superconducting flux qubit where the two quantum states are the direction of a current, and a superconduting phase qubit where the two quantum states are two energy eigenstates. A specific implementation of a superconducting charge qubit is a transmission line shunted plasma oscillation ("transmon") qubit. In some embodiments, the superconducting ancilla qubit includes at least one Josephson junction.

The driving source 150 is coupled to the qudit 110 and the ancilla qubit 120 to enable the driving source 150 to control the quantum state of the qudit 110 and the ancilla qubit 120. For example, the driving source 150 can implement unitary operations on the qudit 110 and the ancilla qubit 120. For example, in embodiments where the qudit 110 is a quantum oscillator and the ancilla qubit 120 is a transmon qubit, the driving source 150 may create electromagnetic signals for driving the qudit 110 and the ancilla qubit 120.

The qubit state detector 130 measures the state of the ancilla qubit 120. In some embodiments, the measurement of the ancilla qubit 120 does not disturb the state of the qudit 110. The qubit state detector 130 transmits a detection result to the controller 140.

The controller 140 is configured to control the driving signals generated by the driving source 150. In some embodiments, the controller 140 may determine the driving signals based on the detection result received from the qubit state detector 130.

As will be described in more detail below, the qudit 110 and the ancilla qubit 120 will be operated upon by multiple unitary operations, controlled by the controller 140 and implemented by the driving source 150. After each unitary operation, a measurement of the ancilla qubit 120 is performed by the qubit state detector 130. A detection result from the qubit state detector 130 is used by the controller to determine a subsequent unitary operation to perform on the joint qudit-qubit system. In some embodiments, the quantum state of the ancilla qubit 120 is reset to an initial state (for example, the ground state) after each measurement and before the unitary operation is performed on the qudit 110 and the ancilla qubit 120.

The above-procedure is discussed in theoretical detail below, followed by an example implementation based on a particular embodiment that uses cQED devices.

Obtaining the Minimal Kraus Representation of a Quantum Channel

Quantum channels (i.e., CPTPs) may be represented using the Kraus representation:

$$\mathcal{T}(\rho) = \sum_{i=1}^{N} K_i \rho K_i^\dagger. \quad \text{(Eqn. 1)}$$

In Eqn. 1, $\mathcal{T}(\rho)$ represents the CPTP map acting on a density matrix $\rho$, which represents the quantum state being operated upon. The CPTP map is represented using N different Kraus operators, $K_i$, where the dagger operator indicates the Hermitian conjugate of a Kraus operator. The Kraus operators are not necessarily unitary, Hermitian, or square matrices. But the CPTP map of Eqn. 1 is trace preserving because $$\sum_{i=1}^{N} K_i^\dagger K_i = \mathbb{1}$$

The Kraus representation is not unique because an arbitrary different set of Kraus operators can be formed using a unitary matrix and the resulting Kraus operators represent the same CPTP map as the original Kraus operators.

To efficiently construct a CPTP map according to some embodiments, it is convenient to work with the Kraus representation with the minimum number of Kraus operators, which is referred to as the Kraus rank of the CPTP map. Since there are at most $d^2$ linearly independent operators for a Hilbert space of dimension d, the Kraus rank is no larger than $d^2$. A non-minimal representation of a CPTP map may be converted to the minimal Kraus representation using efficient computational techniques known in the art. For example, the Kraus representation can be converted into the Choi matrix (a $d^2 \times d^2$ Hermitian matrix) and from there obtain the minimal Kraus representation as described in M. D. Choi, *Linear Algebra Appl.*, 10, 285 (1975), which is incorporated herein by reference in its entirety and at least for its discussion of a technique for determining a minimal Kraus representation. (In a case that any terminology used herein conflicts with the usage of that terminology in Choi, the terminology should be afforded a meaning most consistent with how a person of ordinary skill would understand its usage herein.) A second approach is to calculate an overlap matrix $C_{ij}=\text{Tr}(K_i K_j^\dagger)$ and then diagonalize it, $C=V^\dagger DV$. The new Kraus operators, $\tilde{K}_i = \Sigma_j V_{ij} K_j$, are the most economic representation with some of them being zero matrices if the original representation is redundant.

In some embodiments, a quantum channel may be provided in a representation other than a Kraus representation (e.g., superoperator matrix representation, Jamiolkowski/Choi matrix representation). Such alternative representations may also be converted into a minimal Kraus representation. In embodiments where the quantum channel is provided in superoperator matrix representation, the quantum channel is first converted to the Choi matrix representation. The Choi matrix is then converted to a minimal Kraus representation.

Since CPTP maps are linear in the density matrix $\rho$, $\rho$ may be treated as a vector and the matrix form of the superoperator $\mathcal{T}$ acting on the quantum state represented by the density matrix may be written as:

$$\tilde{\rho}_{ij} = \sum_{m,n} T_{ij,mn} \rho_{mn} \quad \text{(Eqn. 2a)}$$

or $$\vec{\tilde{\rho}} = T \cdot \vec{\rho} \quad \text{(Eqn. 2b)}$$

where $\tilde{\rho} = \mathcal{T}(\rho)$, is the state of the quantum system after the applying the quantum channel.

The above matrix form is a convenient representation of the quantum channel when considering the concatenation of multiple quantum channels because applying a first channel followed by a second quantum channel results in an overall channel represented by the matrix multiplication of the two superoperators representations of the two quantum channels. The matrix form of the quantum channel also allows the quantum channel to be characterized using the determinant of the matrix. For example, for Markovian channels or Kraus rank-2 channels, the determinant of the matrix representation is always positive. The matrix representation, however, makes it difficult to determine whether a given matrix representing a possible quantum channel qualifies as a CPTP map. To make such a determination, the superoperator is converted to the Jamiolkowski/Choi matrix representation or Kraus representation.

Obtaining the superoperator matrix representation of a quantum channel from a Kraus representation is relatively straightforward as compared to obtaining the Kraus representation from the superoperator matrix representation. Given a channel in Kraus form, the superoperator matrix T can be obtained as follows:

$$T = \sum_i^N K_i \otimes K_i^* \qquad \text{(Eqn. 3)}$$

where $K_i$ are the Kraus operators (of which there are N different Kraus operators), and $K_i^*$ is the complex conjugate of the Kraus operator $K_i$. Obtaining the Kraus representation from the superoperator matrix T, however, uses the channel-state duality (i.e., Jamiolkowski-Choi isomorphism), from which it is known that each channel $\mathcal{T}$ for a system with a d-dimensional Hilbert space $\mathcal{H}$ corresponds (one-to-one) to a state (a density matrix) on two subsystems with a Hilbert space $\mathcal{H} \otimes \mathcal{H}$ as follows:

$$\tau = (\mathcal{T} \otimes I)(|\Omega\rangle\langle\Omega|) \qquad \text{(Eqn. 4)}$$

where $$|\Omega\rangle = \frac{1}{\sqrt{d}} \sum_i |i\rangle \otimes |i\rangle$$

is the maximally entangled state of the two subsystems and $\tau$ is the Jamiolkowski matrix representation of the quantum channel. The Choi matrix M is simply a constant multiple of the Jamiolkowski matrix $\tau$ by a constant d, the dimension of the Hilbert space. The Choi matrix M and the super-operator matrix T are related as follows:

$$T_{ij,mn} = M_{im,jn} \qquad \text{(Eqn. 5)}$$

Being a density matrix, $\tau$ is Hermitian. Moreover, $\tau$ is semi-positive definite if and only if $\mathcal{T}$ is completely positive; $\mathcal{T}$ is normalized if T is trace preserving. The Choi matrix M may be converted to the Kraus representation using the fact that, if M is diagonalized:

$$M = \sum_i \lambda_i v_i v_i^\dagger, \qquad \text{(Eqn. 6)}$$

where $v_i$ are $d^2$ dimensional eigenvectors of $\tau$. The Kraus operators are then obtained by rearranging $\sqrt{\lambda_i} v_i$ as d×d matrices. The number of non-zero eigenvalues $\lambda_i$ is the Kraus rank of the corresponding quantum channel. In some embodiments, numerical calculations are performed where the eigenvalues may be truncated by, for example, setting all eigenvalues with a value less than $10^{-10}$ to the value 0.

Theory of Universal Construction of Quantum Channels

Having described above techniques for obtaining the minimal Kraus representation of a particular quantum channel, according to some embodiments, techniques for physically constructing a desired quantum channel are described. In some embodiments, a binary-tree scheme is used to construct any arbitrary CPTP map. The procedure to construct a CPTP map with Kraus rank N is associated with a binary tree of depth $L = \lceil \log_2 N \rceil$. With a single ancilla qubit, the circuit depth of $L = \lceil \log_2 N \rceil$ is the lowest possible, which is what is meant herein when a construction of a quantum channel is referred to as "efficient."

Figure 2:
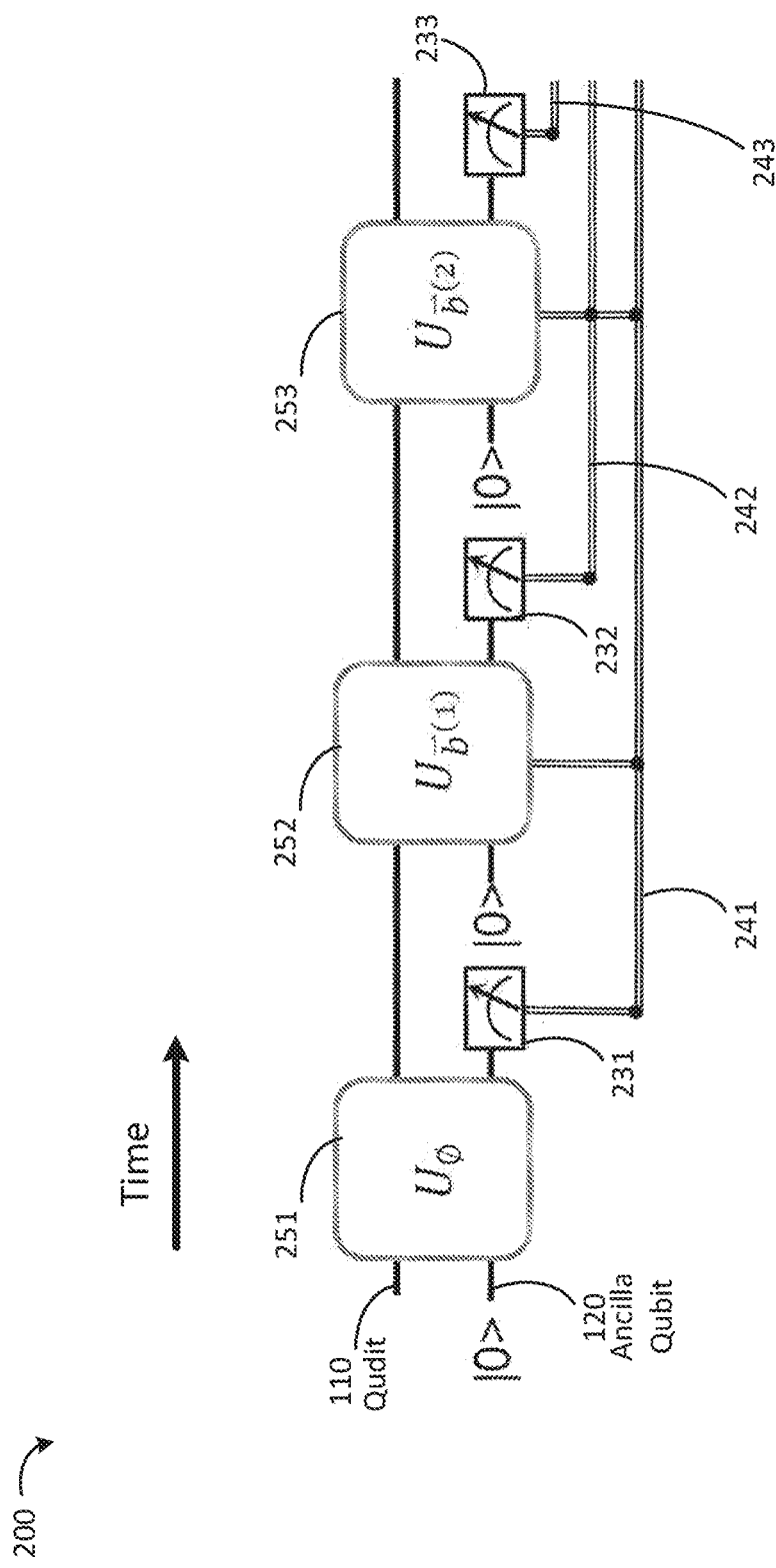
FIG. 2 depicts a quantum circuit for constructing an arbitrary quantum channel, according to some embodiments.

Referring to FIG. 2, a quantum circuit 200 representing the construction of an general quantum channel $\mathcal{T}$ includes a sequence of unitary operations 251-253 on the qudit 110 and the ancilla qubit 120 over time. The quantum circuit 200 also includes a measurement 231-233 after each of the unitary operations 251-253. Each of the measurements 231-233 may be made, for example, by a single qubit state detector 130 at different times. While FIG. 2 shows a particular example with a binary tree depth L=3, it should be understood that this technique may be extended to any binary tree depth, the binary tree depth being a function of the Kraus rank of the desired quantum channel.

The quantum state of the qudit 110 may begin in any arbitrary state represented by a density matrix ρ. In some embodiments, the ancilla qubit 120 is prepared in a predetermined initial state. For example, the initial state of the ancilla qubit 120 may be the ground state, represented by the state |0>. A first unitary operation 251 on the joint qudit-qubit system is performed after initialization of the ancilla qubit 120. After the first unitary operation 251 is complete, a first measurement 231 of the ancilla qubit 120 is performed, resulting in a detection result 241. The first detection result 241 may be output to the controller 140 (not shown in FIG. 2) to determine the second unitary operation 252 to be performed on the joint qudit-qubit system. After the second unitary operation 252 is performed, a second measurement 232 of the ancilla qubit 120 is performed, resulting in a second detection result 242. The second detection result 243 may be output to the controller 140. The first detection result 241 (which may be stored by the controller) and the second detection result 242 are then used to determine the third unitary operation 253 to be performed on the joint qudit-qubit system. After the third unitary operation 253 is performed, a third measurement 233 of the ancilla qubit 120 is performed, resulting in a third detection result 243. The output state of the qudit 120 after all the operations described is $\tilde{\rho} = \mathcal{T}(\rho)$, the state of the qudit after applying the quantum channel $\mathcal{T}$. In some embodiments, the classical information contained in the detection results 241-243 are output and may be used for additional processing.

Figure 3:
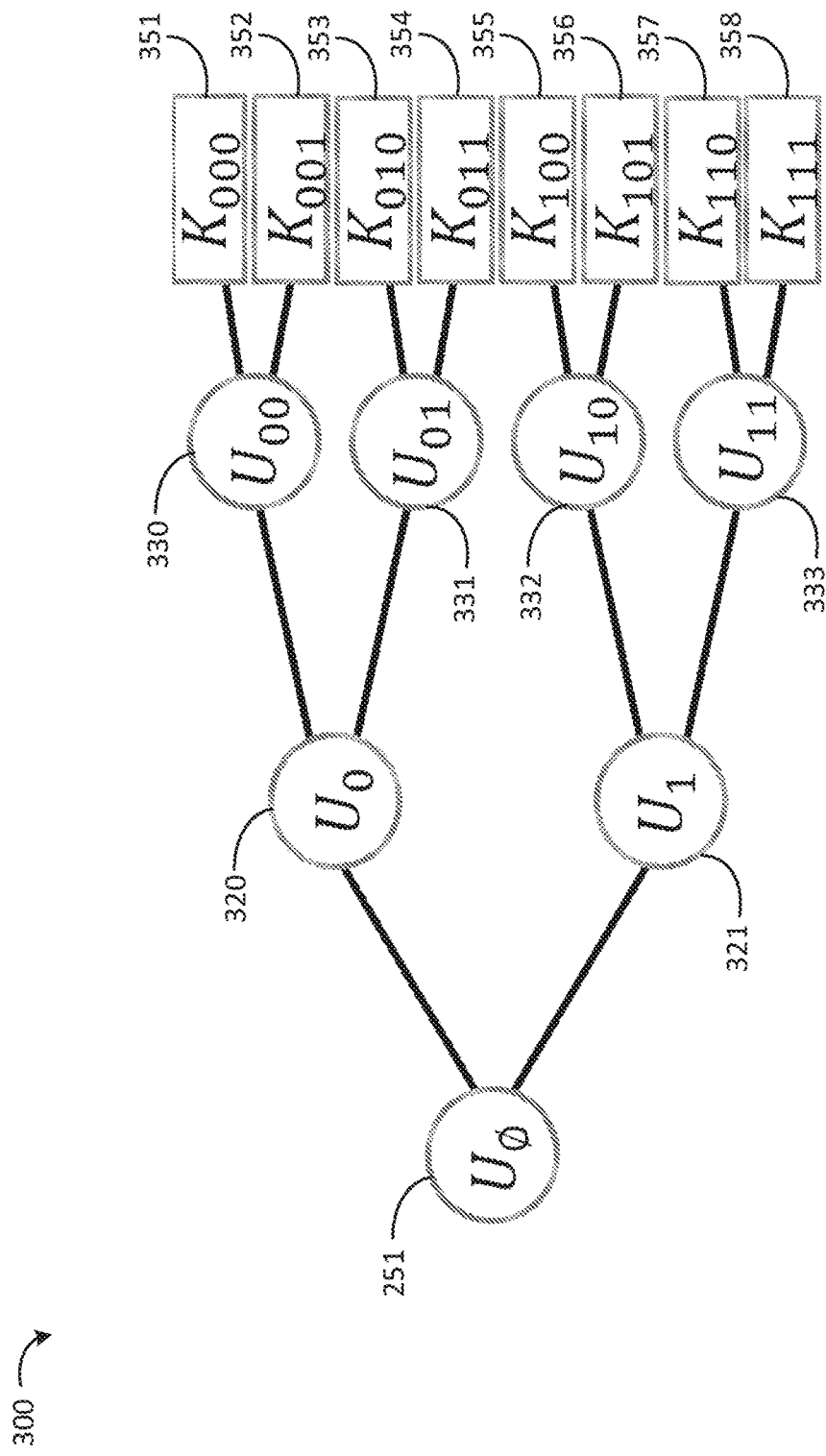
FIG. 3 depicts a binary tree structure used to construct an arbitrary quantum channel, according to some embodiments.

Referring to FIG. 3, a binary tree representation 300 used to create the quantum channel described by the quantum circuit 200 of FIG. 2. The Kraus operators 351-358, represented as $K_{b^{(i)}}$, are associated with the different leaves of the binary tree 300, represented as $b^{(L)} \in \{0,1\}^L$. For example the Kraus operators 351-352, $K_{000}$ and $K_{001}$, are associated with a first unitary operation 251 (which is the same for every Kraus operator, and represented as $U_\varnothing$), a second unitary operation 320 (represented as $U_0$) and a third unitary operation 330 represented as $U_{00}$); the Kraus operators 353-354, $K_{010}$ and $K_{011}$, are associated with the first unitary operation 251, the second unitary operation 320 and a fourth unitary operation 331 (represented as $U_{01}$); the Kraus operators 355-356, $k_{100}$ and $K_{101}$, are associated with the first unitary operation 251, a fifth unitary operation 321 (represented as $U_1$) and a sixth unitary operation 332 (represented as $U_{10}$); and the Kraus operators 357-358, $K_{110}$ and $K_{111}$, are associated with the first unitary operation 251, the fifth unitary operation 321 (represented as $U_1$) and a seventh unitary operation 333 (represented as $U_{11}$). Thus, for a binary tree with depth L=3, there are seven different unitary operations that are determined to implement the desired quantum channel.

The series of joint qudit-qubit unitary operations is applied, as described in FIG. 2. Which unitary operation is applied in the lth round (represented by $U_{b(l)}$) is based on the most recent detection result of the ancilla qubit 120. The binary tree 300 is used to identify the unitary operation to use at each stage based on the detection result of the ancilla qubit 120, the detection result always being one of two results (either a "0" or a "1"). For example, referring to FIGS. 2-3 together, the first unitary operation 251 is not dependent on any measurement results. The second unitary operation 252 depends on the first detection result 241. If the detection result 252 is a "0", then the controller 140 uses the second unitary operation 320 of FIG. 3 as the second unitary operation 252 of FIG. 2. On the other hand, if the detection result 252 is a "1", then the controller 140 uses the fifth unitary operation 321 of FIG. 3 as the secondary unitary operation 252 of FIG. 2. This same technique can be applied to subsequent unitary operations of FIG. 2, such as the third unitary operation 252. At each leaf of the binary tree 300, the branch selected by the controller 140 is based on the most recent detection result. If the detection result is "0", the upper branch is selected; if the detection result is "1", the lower branch is selected.

Using the quantum circuit 200 and the binary tree 300, any arbitrary quantum channel may be constructed and efficiently implemented.

Before describing the details of how to generate a general quantum channel according to some embodiments, a simplified example of the simple case where the tree depth L=1 is described, which correspond to quantum channels with a Kraus rank of less than two. In such a situation, the quantum channel is characterized by two Kraus operators: $K_o$ and $K_1$. In this situation, the quantum circuit of FIG. 2 simplifies to the following steps: (1) initialize the ancilla qubit 120 to the state $|0\rangle$, (2) perform a joint unitary operation $U \in SU(2d)$, and (3) discard ("trace over") the ancilla qubit. No measurement of the ancilla qubit 120 is necessary because there is only one round of operation and therefore no adaptive control or feedback. Thus, in some embodiments, the ancilla qubit 120 is simply ignored after the joint unitary operation is performed. In some embodiments, however, the ancilla qubit 120 may be measured for other reasons other than creating a universal quantum channel of rank 2.

The joint unitary operation U may be represented by a 2d×2d matrix as follows:

$$U = \begin{pmatrix} \langle 0|U|0\rangle & * \\ \langle 1|U|0\rangle & * \end{pmatrix}, \quad (\text{Eqn. 7})$$

where $\langle 0|U|0\rangle = K_0$ and $\langle 1|U|0\rangle = K_1$ are both d×d submatrices and the asterisks (*) denote other submatrices that are irrelevant in the case where U is unitary. Thus the left column of the matrix U in Eqn. 7 is a 2d×d matrix that is an isometry, meaning the following condition is fulfilled:

$$\sum_{b=0,1} (\langle b|U|0\rangle)^\dagger \langle b|U|0\rangle = \mathbb{1}_{d \times d}. \quad (\text{Eqn. 8})$$

The isometry condition of Eqn. 7 is guaranteed by the trace preserving nature of CPTP maps. When the ancilla qubit 120 is discarded (traced over), the quantum channel $\mathcal{T}_U(\rho) = K_0 \rho K_0^\dagger + K_1 \rho K_1^\dagger$ is realized. Thus, any quantum channel of Kraus rank 2 acting on a qudit 110 can be formed by implementing a single joint unitary operation of Eqn. 7 and a single ancilla qubit 120.

As will be described below, if the ancilla qubit 120 is measured rather than ignored, "which trajectory" information is obtained in the form of a detection result. This information can be used to determine additional operations to perform when constructing a quantum channel with a Kraus rank greater than two.

Having thus described the simplified embodiment of constructing an arbitrary Kraus rank 2 quantum channel, a similar but more complicated technique can be used to construct an arbitrarily complex quantum channel with any Kraus rank N. In some embodiments, a quantum channel of Kraus rank N is implemented using a quantum circuit with a circuit depth of $L = \lceil \log_2 N \rceil$, which is the number of joint unitary operations the quantum circuit performs in series to achieve the desired result. The quantum circuit repeats a number of "rounds" of operations, each round including: (1) initializing the ancilla qubit, (2) performing a unitary operation over the joint qudit-qubit system, the unitary operation being based on the detection result from the previous rounds (except the very first round, where the unitary is not based on a measurement result), (3) detecting the ancilla qubit 120, and (4) storing the classical detection result information for use in a subsequent round. For a quantum circuit consisting of L rounds of operations with adaptive control (based on the binary detection results), there are $2^L-1$ possible unitary operations (associated with the $2^L-1$ nodes of a binary tree of depth L) and $2^L$ possible trajectories (associated with the $2^L$ leaves of the binary tree). For example, in FIG. 3, the depth L=3, resulting in the seven unitary operations (251, 320, 321, 330, 331, 332, 333) and eight possible trajectories leading to the leaves 351-358, represented by the eight different Kraus operators of the quantum channel with Kraus rank eight.

As discussed above in connection with FIG. 2, the lth unitary operation is represented by $U_{b^{(l)}}$, and is associated with the node of the binary tree, $b^{(l)} = (b_1 b_2 \ldots b_L) \in \{0,1\}^l$) with l=0, ..., L-1. For L=1, there is only one unitary operation for $b^{(l)} = \emptyset$, which is $U_{b^{(l)}\emptyset}$, as determined by Eqn. 7 above. Generally, the unitary gate, $U_{b^{(l)}}$ is determined in a way similar to Eqn. 7:

$$U_{b^{(l)}} = \begin{pmatrix} \langle 0|U_{b^{(l)}}|0\rangle & * \\ \langle 1|U_{b^{(l)}}|0\rangle & * \end{pmatrix}. \quad (\text{Eqn. 9})$$

In embodiments where the ancilla always starts in the ground state $|0\rangle$), it is sufficient to specify the d×d submatrices $\langle b_{l+1}|U_{b^{(l)}}|0\rangle$, where $|b_{l+1}\rangle$ is the projectively measured state of the ancilla qubit for $b_{l+1}=0,1$. Each leaf of the binary tree, $b^{(L)} \in \{0,1\}^L$ is associated with Kraus operators labeled in binary notation, $K_{b^{(l)}} = K_i$, where $i=(b_1 b_2 \ldots b_L)+1$ and $K_{i>N}=0$, where N is the Kraus rank of the quantum channel, as illustrated by the leaves 351-358 of FIG. 3. Each Kraus operator has an associated singular value decomposition Kraus operator $K_{b^{(L)}} = W_{b^{(L)}} D_{b^{(L)}} V_{b^{(L)}}^\dagger$.

In some embodiments, the d×d submatrix $\langle b_{l+1} | U_{b^{(l)}} | 0 \rangle$ may be constructed as from the known Kraus operators of the minimal Kraus representation as follows. For each node $b^{(l)}$ with l=1, ..., L−1, a nonnegative Hermitian matrix is determined and diagonalized as follows:

$$\sum_{b_{l+1},\ldots,b_L} K_{b^{(L)}}^\dagger K_{b^{(L)}} = V_{b^{(l)}} D_{b^{(l)}}^2 V_{b^{(l)}}^\dagger \equiv M_{b^{(l)}}^2, \qquad \text{(Eqn. 10)}$$

where the $V_{b^{(l)}}$ is a unitary matrix, $D_{b^{(l)}}$ is a diagonal matrix with nonnegative elements, and $M_{b^{(l)}}$ is a Hermitian matrix satisfying $M_{b^{(l)}} = V_{b^{(l)}} D_{b^{(l)}} V_{b^{(l)}}^\dagger$. For notational convenience, a matrix $P_{b^{(l)}}$ is introduced and defined as:

$$(P_{b^{(l)}})_{j,k} = \text{sgn}[(D_{b^{(l)}})_{j,k}], \qquad \text{(Eqn. 11)}$$

where sgn(0) is defined as zero such that $P_{b^{(l)}}^2 = P_{b^{(l)}}$ and $P_{b^{(l)}} D_{b^{(l)}} = D_{b^{(l)}} P_{b^{(l)}} = D_{b^{(l)}}$. An orthogonal projection of matrix $P_{b^{(l)}}$ is defined as $P_{b^{(l)}}^\perp = \mathbb{I} - P_{b^{(l)}}$, as well as the related projection $Q_{b^{(l)}}$, which is defined as $$Q_{b^{(l)}} \equiv V_{b^{(l)}} P_{b^{(l)}}^\perp V_{b^{(l)}}^\perp \qquad \text{(Eqn. 12)}$$

Further, an inverse matrix is defined as:

$$(D_{b^{(l)}}^{-1})_{j,k} = \begin{cases} 1/(D_{b^{(l)}})_{j,k} & \text{if } D_{b^{(l)}} \neq 0, \\ 0 & \text{otherwise.} \end{cases} \qquad \text{(Eqn. 13)}$$

Additionally, the Moore-Penrose pseudoinverse of the matrix $M_{b^{(l)}}$ is defined as:

$$M_{b^{(l)}}^+ = V_{b^{(l)}} D_{b^{(l)}}^{-1} V_{b^{(l)}}^\dagger. \qquad \text{(Eqn. 14)}$$

Finally, for l=0 the following values are fixed: $V_{b^{(0)}} = D_{b^{(0)}} = D_{b^{(0)}}^{-1} = P_{b^{(0)}} = \mathbb{I}$ and $P_{b^{(0)}}^\perp = 0$.

Based on the above definitions and relations, the explicit expression for the relevant submatrices of the unitary matrices is:

$$\langle b_{l+1} | U_{b^{(l)}} | 0 \rangle = M_{b^{(l+1)}} M_{b^{(l)}}^+ + \frac{1}{\sqrt{2}} Q_{b^{(l)}}, \qquad \text{(Eqn. 15)}$$

with $b^{(l+1)} = (b^{(l)}, b_{(l+1)})$ for l=0, ..., L−2, and $$\langle b_{l+1} | U_{b^{(l)}} | 0 \rangle = K_{b^{(l+1)}} M_{b^{(l)}}^+ + \frac{1}{\sqrt{2}} W_{b^{(l+1)}} V_{b^{(l+1)}}^\dagger Q_{b^{(l)}} \qquad \text{(Eqn. 16)}$$

for l=L−1. The unitary matrix $U_{b^{(l)}}$ may therefore be completely determined based on Eqn. 15 and Eqn. 16, using the various aforementioned definitions and $W_{b^{(l)}}$ is a unitary matrix that ensures that the isometric condition $\sum_{b_{l+1}=0,1} (\mathbb{I} b_{l+1} | U_{b^{(l)}} | 0 \rangle)^\dagger \langle (b_{l+1} | U_{b^{(l)}} | 0 \rangle) = \mathbb{I}_{d \times d}$ is fulfilled. Because each term in Eqn. 15 and Eqn. 16 may be determined from the Kraus operators of the minimal Kraus representation, each unitary operation needed to construct a quantum circuit and binary tree similar to the examples shown in FIGS. 2 and 3 may be determined from the Kraus operators of the minimal Kraus representation. It is noted that for L=1, the above equations simplify to:

$$\langle b_1 | U_{b^{(0)}} | 0 \rangle = K_{b^{(1)}} \qquad \text{(Eqn. 17)}$$
$$= \begin{cases} K_1 & \text{for } b_1 = 0, \\ K_2 & \text{for } b_1 = 1, \end{cases}$$

which is consistent with the result for a quantum channel of Kraus rank 2 as discussed in connection with Eqn. 7 above.

Figure 4:
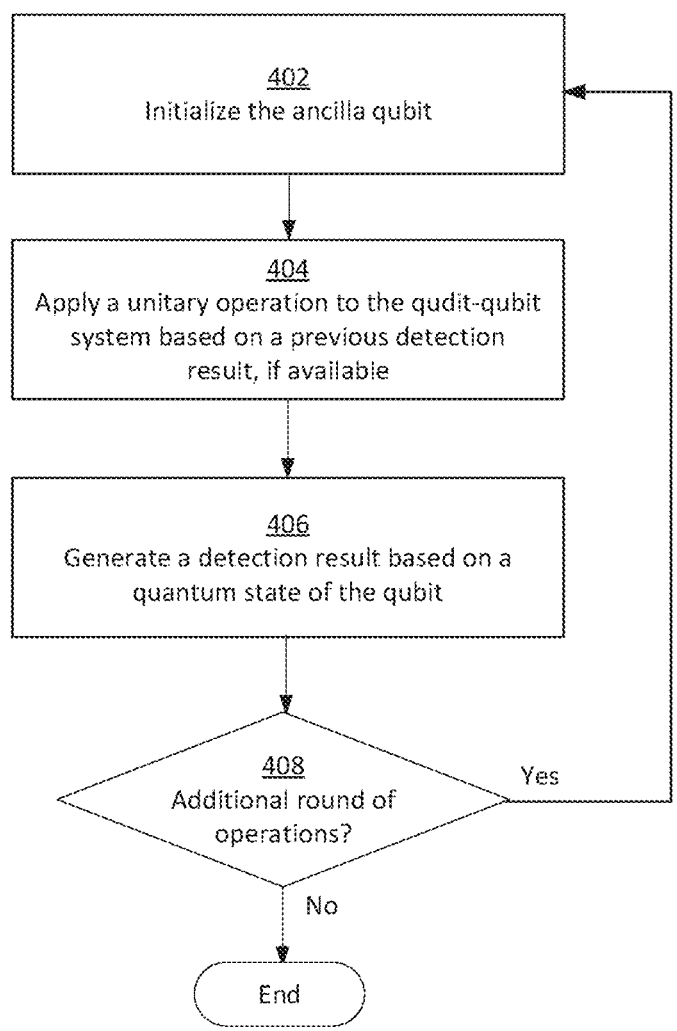
FIG. 4 is a flowchart of a method of operating a quantum information system, according to some embodiments.

FIG. 4 depicts a method 400 of operating a quantum information system that includes a qudit coupled to an ancilla qubit forming a qudit-qubit system, according to some embodiments. Method 400 may be applied, for example to system 100 shown in FIG. 1 and discussed above, though may also be applied to any suitable quantum system in which an ancilla qubit 120 is coupled to a qudit 110. In some embodiments, the method 400 is used to implement the quantum circuit 200 shown in FIG. 2.

At act 402, the ancilla qubit 120 is initialized to a predetermined quantum state. In some embodiments, the ancilla qubit 120 is initialized to the ground state of the ancilla qubit 120. The initialization of the quantum state of the ancilla qubit 120 may be perfomed by driving the state of the ancilla qubit 120 with a driving signal from the driving source 150 and/or performing a measurement of the ancilla 120 using the qubit state detector to project the ancilla qubit 120 into a particular state.

At act 404, the driving source applies a unitary operation to the qudit-qubit system based on a previous detection result, if available. For the first round of operations, there is no previous detection result, so the unitary operation is independent of measurement results. For all other rounds of operations, one or more previous measurement results may be used to determine the unitary operation to apply to the joint qudit-qubit system. The choice of unitary operator may be determined using a binary tree structure, such as the binary tree structure 300 shown in FIG. 3. In some embodiments, the unitary operation is implemented using one or more driving signals that act on the qudit 110 and the ancilla qubit 120 at different times such that the unitary operation is decomposed into multiple simpler unitary operations.

At act 406, a detection result is generated by the qubit state detector 130 based on the quantum state of the ancilla qubit 120. In some embodiments, the qubit state detector 130 may measure whether the ancilla qubit 120 is in the ground state or the excited state. In other embodiments, the qubit state detector 130 may generate a detection result by measuring the ancilla qubit 120 in a basis that includes superpositions of the ground state and the excited state. In some embodiments, the detection result is stored in a storage medium associated with the controller 140 for later use.

At act 408, the controller 140 determines whether there are additional rounds of operations to be performed. If yes, then the method 400 returns to act 402. If no, then the method 400 ends. In some embodiments, the number of rounds of operations is determined by the Kraus rank of the desired quantum channel.

Embodiments Based On Circuit QED

The previous section describes how any arbitrary quantum channel (i.e., CPTP map) can be created using a series of unitary operations and measurements with adaptive control of the unitary operations used based on detection results from the measurements. Now, an embodiment based on a physical implementation of the qudit and ancilla qubit using cQED is described.

Figure 5:
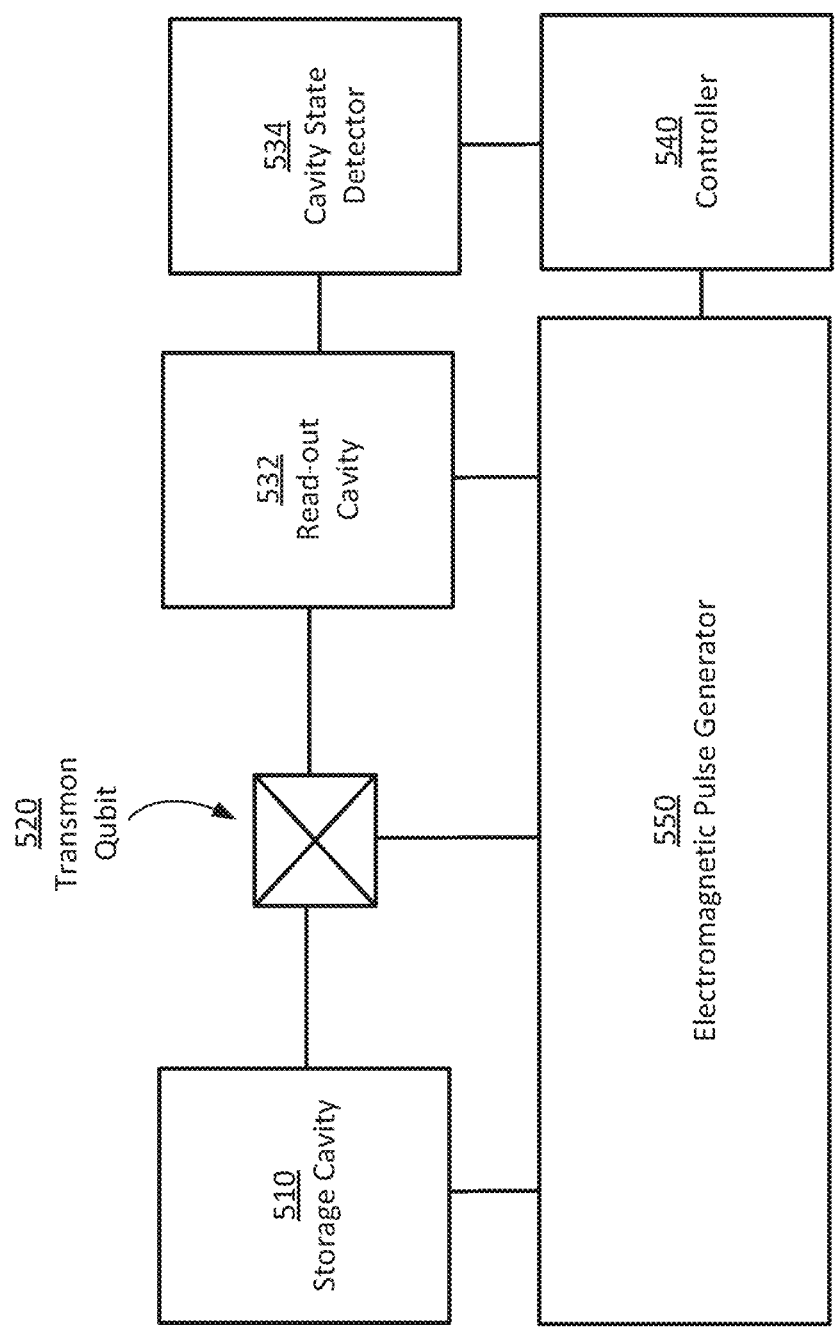
FIG. 5 is a block diagram of a quantum information system based on cavity quantum electrodynamics, according to some embodiments.

Referring to FIG. 5, an example quantum information system 500 based on cQED includes storage cavity 510 and a transmon qubit 520 that are dispersively coupled together. The storage cavity 510 may be a stripline cavity or a three-dimensional cavity. The storage cavity 510 supports electromagnetic radiation, such as microwave radiation, to create a quantum oscillator. A predetermined number d of the photon number states of the quantum oscillator stored within the storage cavity 510 are used to implement the qudit 110 of FIG. 1. The transmon qubit 520 is used as the ancilla qubit 120.

Operations between the storage cavity 510 and the transmon qubit 520 may be used to perform entangling operations between the two quantum systems. These operations may implemented using driving signals generated by an electromagnetic pulse generator 550 controlled by a controller 540.

The quantum information system includes a read-out cavity 532 that is also coupled to the transmon qubit 520. Operations between the read-out cavity 532 and the transmon qubit 510 may map the quantum state of the transmon qubit to the state of a quantum oscillator within the read-out cavity 532. These operations may be controlled by a controller 540, which controls driving signals that control the operations performed on the read-out cavity and the transmon qubit 520. In operation, the read-out cavity 532 may be operated as a fast "readout" oscillator whereas the storage cavity 510 may be operated as a "storage" oscillator. In some embodiments, the read-out cavity 532 may have a shorter decoherence time (and a lower quality factor) than the storage cavity 510. When the state of the readout oscillator is detected using a cavity state detector 534, the state of the storage cavity 510 remains undisturbed by the measurement. By transferring quantum state information from the transmon qubit 520 to the read-out cavity 532 and then detecting the quantum state of the read-out cavity using the cavity state detector 534, the state of the transmon qubit 520 may be determined without disturbing the state of the quantum oscillator within the storage cavity 510. This may be referred to as a quantum non-demolition measurement. In some embodiments, detection results from the cavity state detector 534 may be stored by the controller 540 for use in determining subsequent driving signals for controlling the transmon qubit 520 and the storage cavity 510.

In some embodiments, electromagnetic driving pulses generated by the electromagnetic pulse generator 550 are used to implement unitary operations on the quantum state of the quantum oscillator stored in the storage cavity 510 and the quantum state of the transmon qubit 520. For example, an electromagnetic signal $\Omega(t)$ may be applied to the transmon qubit 520 and an electromagnetic signal $\Omega(t)$ may be applied to the quantum oscillator within the storage cavity 510. Generally in the discussion below, application of such an electromagnetic signal or pulse may also be referred to as "driving" of the qubit or oscillator.

According to some embodiments, the joint qudit-qubit system (e.g., the joint system of the quantum oscillator and the transmon qubit 520) of the quantum information system 500 may be described using the Hamiltonian:

$$H/\hbar = \omega_c \hat{a}^\dagger \hat{a} + \omega_q |e\rangle\langle e| + \chi \hat{a}^\dagger \hat{a} |e\rangle\langle e|, \quad \text{(Eqn. 18)}$$

where higher order terms are omitted. In Eqn. 18, $\omega_q$ is the qubit transition frequency between the ground state |g⟩ (sometimes referred to as |0⟩) and the excited state |e⟩ (sometimes referred to as |1⟩) of the transmon qubit 520; $\omega_c$ is the resonant frequency of the cavity; $\chi$ is the dispersive coupling constant between the transmon qubit 520 and the oscillator; $\hat{a}^\dagger$ and $\hat{a}$ are the creation and annihilation operators, respectively, for a photon within the storage cavity 510. As a result of the dispersive coupling, when a photon is added to the cavity the qubit transition frequency changes by $\chi$. Driving signals may thereby modify a particular Fock state |n⟩ of the oscillator by driving the transmon qubit 520 (i.e., by applying an electromagnetic impulse to the transmon qubit 520) at a frequency $\omega_q + n\chi$. According to some embodiments, such a driving signal may modify the Fock state |n⟩ by altering the phase of the state.

As illustrative yet non-limiting examples, the transmon qubit 520 may have a transition frequency $\omega_q$ between 5 GHz and 10 GHz, such as between 7 GHZ and 8 GHZ, or approximately 7.6 GHz; the quantum mechanical oscillator may have a transition frequency $\omega_c$ between 6 GHz and 11 GHz, such as between 8 GHz and 9 GHz, or approximately 8.2 GHz; the dispersive shift $\chi$ may be between 1 MHz and 10 MHz, such as between 4 MHz and 9 MHz, or such as approximately 8.2 MHz. In some embodiments, the dispersive shift $\chi$ may be three orders of magnitude larger than the dissipation of the transmon qubit 520 and the storage cavity 510, which allows for greater unitary control over the joint system.

FIG. 5 depicts an illustrative spectrum 500 of a transmon qubit coupled to a quantum oscillator, according to some embodiments. As discussed above, dispersive coupling between a physical qubit and a quantum mechanical oscillator causes the number states of the oscillator |n⟩ to resolve to different frequencies of the transmon qubit. This configuration is sometimes referred to the "number-split regime."

Figure 6:
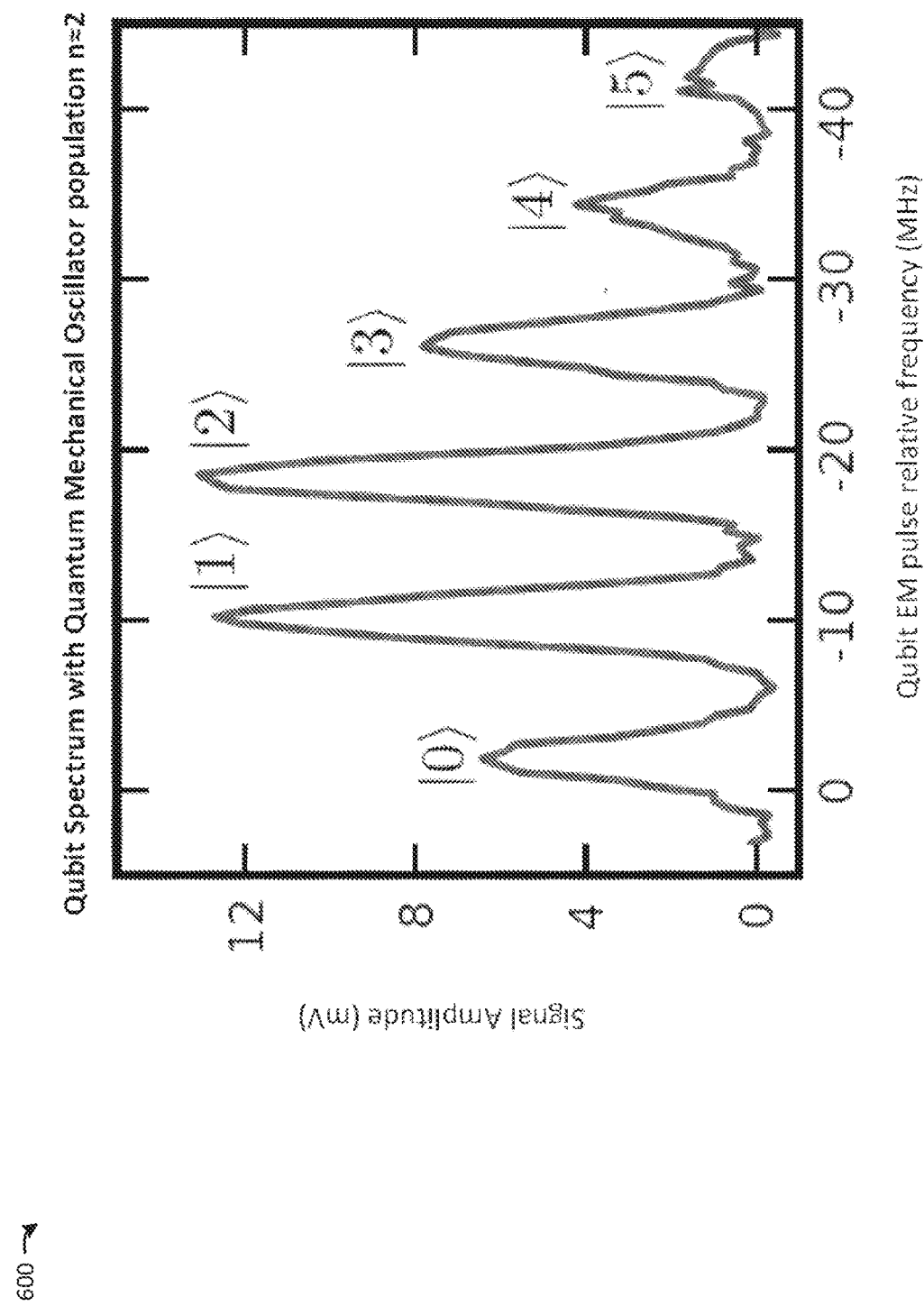
FIG. 6 depicts an example spectrum of a transmon qubit coupled to a quantum oscillator of a storage cavity, according to some embodiments.

FIG. 6 is an example of a qubit spectrum 600 for a qubit dispersively coupled to an resonant cavity which has an average photon number $\bar{n} \approx 2$. The horizontal axis of the figure represents the shift in the qubit transition frequency for excitations of different Fock states of the coupled resonant cavity. Put another way, the figure illustrates that the transition frequency of the transmon qubit depends on the number of photons in the cavity.

In the example spectrum 600 of FIG. 5, the different Fock states of the oscillator |0⟩, |1⟩, |2⟩, |3⟩, |4⟩ and |5⟩ are each associated with different transition frequencies of the transmon qubit. For example, the transition frequency of the qubit where there are no photons in the cavity is defined as 0 MHz of detuning (and equal to the ostensible qubit transition frequency, which as discussed above may in some embodiments be between 5 GHz and 10 GHz). When the cavity includes a single photon, the transition frequency of the qubit is detuned by approximately 10 MHz; when the cavity includes two photons, the transition frequency of the qubit is detuned by approximately 17 MHz; when the cavity includes three photons, the transition frequency of the qubit is detuned by approximately 26 MHz; when the cavity includes four photons, the transition frequency of the qubit is detuned by approximately 34 MHz; and when the cavity includes five photons, the transition frequency of the qubit is detuned by approximately 43 MHz. This number-dependent detuning of the transition frequency can be approximated as an $n\chi$ detuning, where n is the excitation number of the cavity and $\chi$ is a detuning per photon number. For example, $\chi$ may be approximately 8.3 MHz.

Figure 7:
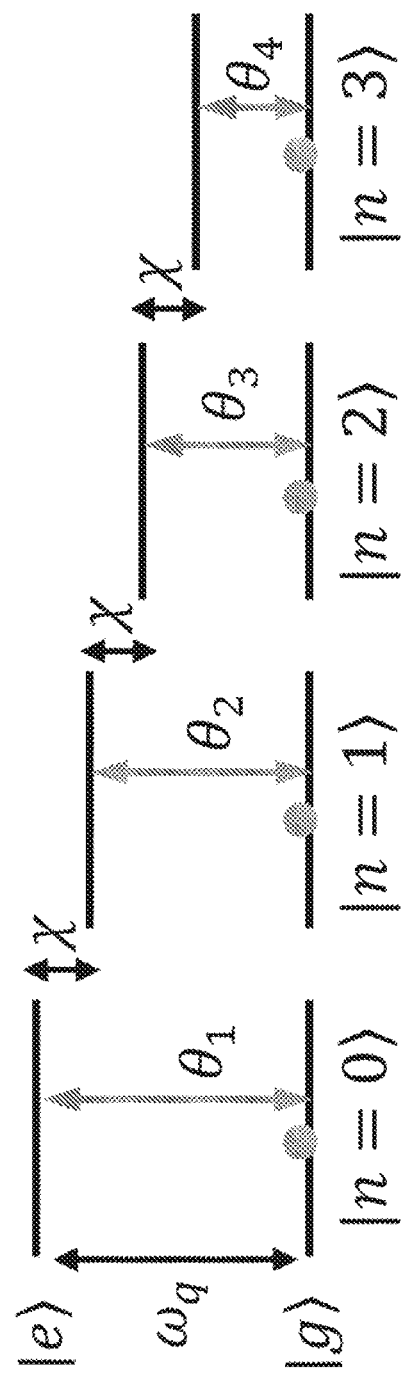
FIG. 7 depicts an energy level diagram of a transmon qubit coupled to a quantum oscillator of a storage cavity, according to some embodiments.

FIG. 7 depicts an energy level diagram 700 for the joint system that includes the transmon qubit 520 dispersively coupled to the storage cavity 510, according to some embodiments. Based on this number-dependent detuning of the transition frequency of the transmon qubit 520, the qubit may be addressed selectively using driving pulses with narrow spectral widths and central frequencies tuned to match the detuned transition frequencies for a particular excitation number. For example, driving the qubit at a frequency with 10 MHz detuning will cause the quantum state of the cavity to change only if there is a single photon in the cavity. Thus, a driving pulse may be applied to adjust the quantum phase of a particular Fock state of the oscillator by selecting the appropriate frequency to match the targeted state. A driving pulse to implement a unitary operation may also include multiple pulses each targeting different Fock states within the same signal or separate signal. Since individual pulses may be of a different frequency, the multiple frequency components can be combined into a single pulse.

In some embodiments, the transmon qubit 520 may be driven independently from the storage cavity 510, causing a rotation of the quantum state of the transmon qubit 520. The amount of rotation of the quantum state may be dependent on the quantum state of the storage cavity 510 (e.g., the rotation can be photon number dependent). Such rotations induce a photon number dependent Berry phase to the quantum state of the transmon qubit 520, while leaving the state of the transmon unmodified. The different phases $\theta_i$ are qualitatively illustrated in FIG. 6, with the phase decreasing as a function of the photon number state of the quantum oscillator. This type of operation is referred to as a Selective Number-dependent Arbitrary Phase (SNAP) operation and is described in detail in U.S. patent application Ser. No. 15/552,998, entitled "TECHNIQUES OF OSCILLATOR CONTROL FOR QUANTUM INFORMATION PROCESSING AND RELATED SYSTEMS AND METHODS," and filed Aug. 23, 2017, which is incorporated herein by reference in its entirety and at least for its discussion of implementing SNAP gates. (In a case that any terminology used herein conflicts with the usage of that terminology in U.S. patent application Ser. No. 15/552,998, the terminology should be afforded a meaning most consistent with how a person of ordinary skill would understand its usage herein.)

In some embodiments, SNAP gates may be used to implement the following entangling unitary operation:

$$U_{ent}(\theta_i) = \left( \begin{array}{c|c} S_0 & -S_1 \\ \hline S_1 & S_0 \end{array} \right) \quad \text{(Eqn. 19)}$$

$$= \begin{pmatrix} \cos\frac{\theta_1}{2} & & & -\sin\frac{\theta_1}{2} & & \\ & \ddots & & & \ddots & \\ & & \cos\frac{\theta_d}{2} & & & -\sin\frac{\theta_d}{2} \\ \hline \sin\frac{\theta_1}{2} & & & \cos\frac{\theta_1}{2} & & \\ & \ddots & & & \ddots & \\ & & \sin\frac{\theta_d}{2} & & & \cos\frac{\theta_d}{2} \end{pmatrix}$$

$$= \prod_{n=0}^{d-1} \exp(-iY_n \theta_n / 2),$$

where $Y_n \equiv -i|g,n\rangle\langle e,n|+H.c.$ is the Pauli Y operator for the two-dimensional subspace associated with n photons in the storage cavity 510, H.c. represents the Hermitian conjugate, and d is the dimensionality of the qudit, physically implemented using d energy levels of the quantum oscillator. The entangling operation $U_{ent}$ is associated with a quantum channel described by the Kraus operators $\{S_0, S_1\}$. A related entangling operation $U'_{ent}$ may be formed by first acting on the qudit (e.g., the storage cavity 510) alone with a unitary operation $V^\dagger$ and, after performing $U_{ent}$, performing an adaptive unitary operations $W_0$ or $W_1$ on the storage cavity 510 alone, with the unitary operations $W_0$ or $W_1$ being dependent on the detection result from a previous measurement of the transmon qubit 520. Thus:

$$U'_{ent} = \begin{pmatrix} W_0 & 0 \\ 0 & W_1 \end{pmatrix} \left( \begin{array}{c|c} S_0 & -S_1 \\ \hline S_1 & S_0 \end{array} \right) \begin{pmatrix} V^\dagger & 0 \\ 0 & V^\dagger \end{pmatrix} \quad \text{(Eqn. 20)}$$

$$= \begin{pmatrix} W_0 S_0 V^\dagger & * \\ W_1 S_1 V^\dagger & * \end{pmatrix}.$$

The decomposition of Eqn. 20 is referred to as the "cosine-sine decomposition" and matches the relevant two submatrices of the desired unitary operation:

$$U = \begin{pmatrix} \langle 0|U|0\rangle & * \\ \langle 1|U|0\rangle & * \end{pmatrix}, \quad \text{(Eqn. 21)}$$

with $\langle 0|U|0\rangle = W_0 S_0 V^\dagger$ and $\langle 1|U|0\rangle = W_1 S_1 V^\dagger$. Based on this, the quantum circuit similar to that of FIG. 2 for a general quantum channel in cQED can be determined by identifying the matrices $W_0$, $S_0$, $W_1$, $S_1$, and $V$ for unitary operations at the different rounds $U=U_b^{(i)}$. In this way, potentially complicated joint unitary operations (E.g., $U_b^{(i)}$ of FIG. 2) into three simpler unitary operations: two unitary operations that act on only the oscillator and one unitary operation that acts on only the transmon qubit 520.

In some embodiments, the entangling unitary operation $U'_{ent}$ is determined in the following way. First, the singular value decompositions $\langle 0|U|0\rangle = W_0 S_0 V_0^\dagger$ and $\langle 1|U|0\rangle = W_1 S_1 V_1^\dagger$ are determined, with the W matrices and the S matrices set to their desired values based on Eqn. 20. Then, it is ensured that $V_0 = V_1 = V$. To uniquely the decomposition, some embodiments may require that the singular values $S_0$ are arranged in descending order such that $(S_0)_{j,j} \geq (S_0)_{j+1,j+1}$, while the singular values in $S_1$ are arranged in ascending order such that $(S_1)_{j,j} \leq (S_1)_{j+1,j+1}$. The isometric condition $\Sigma_{b=0,1}(\langle b|U|0\rangle^\dagger)\langle b|U|0\rangle = \mathbb{1}_{d \times d}$ ensures that $V_0^\dagger V_1 S_1^2 V_1^\dagger V_0 = \mathbb{1}_{d \times d} - S_0^2$. Since both $S_1^2$ and $\mathbb{1}_{d \times d} - S_0^2$ are diagonal with elements in ascending order, $V_1^\dagger V_0$ must be the identity, which means $V_0 = V_1 = V$. Thus, all the components of $U'_{ent}$, which fulfills $\langle 0|U|0\rangle = W_0 S_0 V^\dagger$ and $\langle 1|U|0\rangle = W_1 S_1 V^\dagger$, are obtained.

In terms of quantum circuits, the techniques described herein for cQED systems simplifies a complex 2d-dimensional unitary operation to two unitary operations acting on the qudit (e.g., quantum oscillator) alone, an entangling operation and a measurement, where the unitary operations used may be based on the detection results from the measurement.

Computer and Software Aspects

Figure 8:
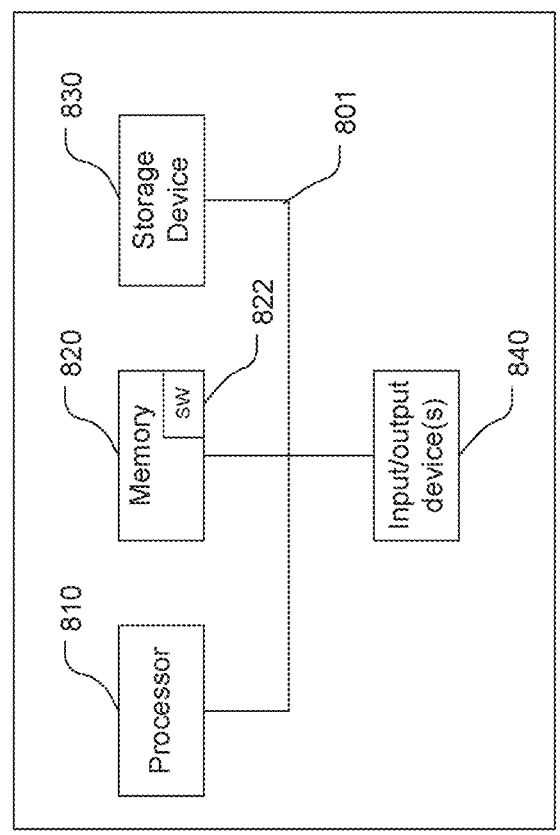
FIG. 8 is a block diagram of a computer system, according to some embodiments.

In some embodiments, at least one non-transitory storage medium is encoded with executable instructions that, when executed by at least one processor, cause the at least one processor to carry out a method of creating a generalized quantum channel. In some embodiments, the controller 140 and/or the controller 540 may include a computer system that performs such a method. Referring to FIG. 8, an example computer system 800 may include a processor 810, a memory 820, a storage device 830, and input/output device(s) 840. A system bus 801 couples the various components of the computer system 800 to allow the exchange of information between components. In some embodiments, the at least one non-transitory storage medium encoded with executable instructions that, when executed by at least one processor, cause the at least one processor to carry out a method of creating a generalized quantum channel may include the memory 820 and/or the storage device 830.

The computer system 800 may include a variety of non-transitory computer readable media, including the memory 820 and the storage device 830. Computer readable media can be any available media including both volatile and nonvolatile media, removable and non-removable media. Examples of computer readable media includes storage media such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 800.

The memory 820 may include computer storage media in the form of volatile and/or nonvolatile memory such as read only memory (ROM) and random access memory (RAM). A basic input/output system BIOS, containing the basic routines that help to transfer information between elements within computer system 800, such as during start-up, is typically stored in ROM. RAM typically contains data and/or program modules that are immediately accessible to and/or presently being operated on by the processor 810. By way of example, computer system 800 includes software 822 stored in the memory 820 that is executable by the processor 810.

The computer 800 may also include other removable/non-removable, volatile/nonvolatile computer storage media. By way of example only, FIG. 8 illustrates a storage device 830. The storage device 830 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The computer system 800 may include a number of input/output device(s) 840. For example, to facilitate operation in a networked environment, the computer system 800 may use the network interface to store information in network storage drives or receive information from external computer systems connected to the network. Another example of the input/output device(s) 840 include user interfaces that allow a user of the computer system 800 to input information (such as an indication of a desired quantum channel) and receive feedback. For example, the input/output device(s) 840 may include a keyboard, a touchscreen interface, a mouse, a microphone, a speaker, and/or a display. Another example of the input/output device(s) 840 is a communication interface that allows the computer system to send and receive data from to and from other devices, such as the qubit state detector 130 and/or the driving source 150. For example, the computer system 800 may receive detection results via the input/output device(s) 840 from the qubit state detector 130, store the detection results in the memory 820 and/or the storage device 830, use the detection result to process data using the processor 810, and then transmit information to control the driving signals implemented by the driving source 150 via the input/output device(s) 840.

Figure 9:
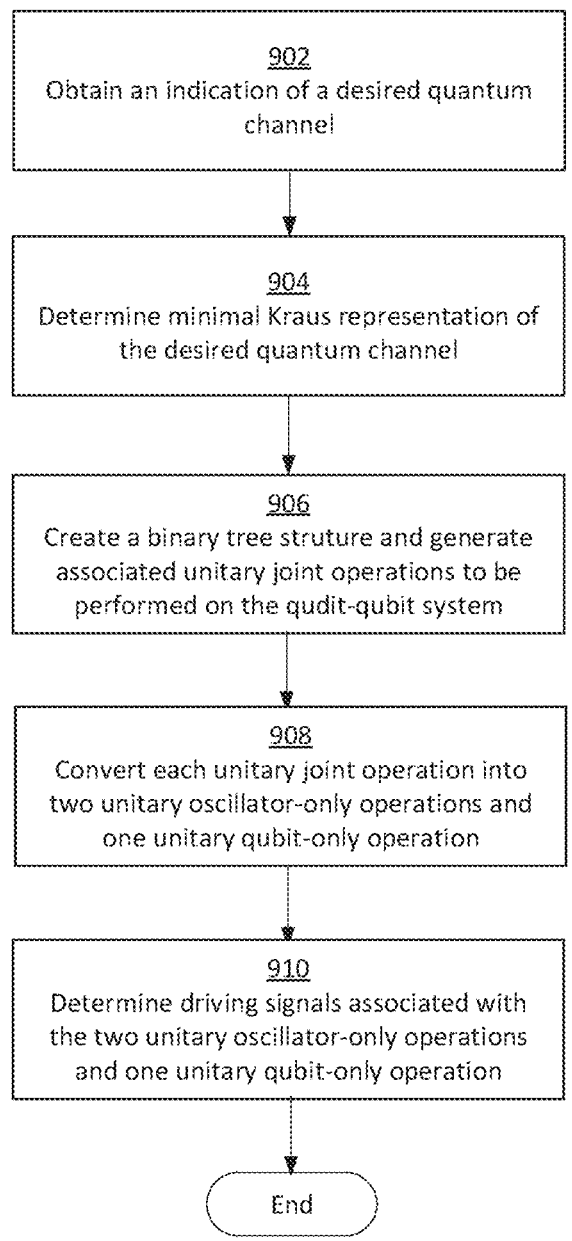
FIG. 9 is a flow chart of a method of operating a quantum information system, according to some embodiments.

FIG. 9 depicts an example method 900 for creating a generalized quantum channel. The acts of method 900 may, by way of example, be performed by the processor 810 of the computer system 800, which is part of the controller 140.

At act 902, the processor 810 obtains an indication of a desired quantum channel. The indication may be obtained via the input/output device(s) 840. For example, a user may enter the indication using a user interface. Alternatively, the indication may be received from a different computer system via the network interface. In some embodiments, the indication may be a set of Kraus operators associated with the desired quantum channel. In another embodiment, the indication may be a super-operator matrix, a Choi matrix, or a Jamiolkowski matrix.

At act 904, the processor 810 determines a minimal Kraus representation of the desired quantum channel. The exact procedure for achieving this is dependent on the form of the indication of the desired quantum channel. For example, if the indication of the desired quantum channel obtained in act 902 includes the Kraus operators of the minimal Kraus representation of the desired quantum channel, then act 902 may simply include verifying that the obtained Kraus operators are indeed the minimal Kraus representation. Alternatively, if the indication of the desired quantum channel is a super-operator matrix, a Choi matrix, or a Jamiolkowski matrix, the indication is converted to the minimal Kraus representation using the techniques described above.

At act 906, the processor 810 creates a binary tree structure and generates associated unitary joint operations to be performed on the qudit-qubit system. As described above, in some embodiments, each node of the binary tree structure is associated with a respective one of the multiple unitary joint operations and each leaf of the binary tree structure is associated with a Kraus operator of the minimal Kraus representation of the desired quantum channel. In some embodiments, the unitary joint operations are generated using Eqn. 15 and Eqn. 16.

At act 908, the processor 908 converts each unitary joint operation into two unitary oscillator-only operations and one unitary qubit-only operation. In some embodiments, the unitary qubit-only operation is a SNAP operation. In some embodiments, the unitary oscillator-only operations and the unitary qubit-only operation are determined using Eqn. 20.

At act 910, the processor 810 determines driving signals associated with the two oscillator-only operations and the one unitary qubit-only operation. In some embodiments, the driving signals for the unitary qubit-only operation have spectral properties based on the photon number dependent transition frequencies described in FIG. 7. In some embodiments, an indication of the determined driving signals is provided to the driving source 150, where the driving signals are generated and directed toward the qudit 110 and the ancilla qubit 120.

Example Applications

The general quantum channels (i.e., CPTP maps) described in the present application may include multiple physical operations including cooling, quantum gates, measurements, and dissipative dynamics. The capability to construct an arbitrary CPTP map offers a unified approach to many aspects of quantum technology. To illustrate the wide range of impact of quantum channel construction, several example applications are described below. Embodiments are not limited to any of these applications.

A first application of constructing a generalized quantum channel is the initialization and/or stabilization of the quantum state of a qudit. Many quantum information processing tasks require working with a well-defined (often pure) initial state. One common approach is to sympathetically cool the system to the ground state by coupling to a cold bath, or optically pumping to a specific dark state, and then performing unitary operations to bring the system to a desired initial state. This can be slow if the system has a large relaxation time scale. The techniques described above, however, can actively cool the system by measurement and adaptive control. The above channel construction technique can be applied to discretely pump the qudit from an arbitrary state into the target state a, which can be pure or mixed. The pumping time depends on the quantum gate and measurement speed, instead of the natural relaxation rate.

The quantum channel $\rho \mapsto \xi_{init}(\rho) = Tr(\rho)\sigma$ stabilizes the quantum state of the qudit to the target state $\sigma$. If the target state has diagonal representation $\sigma = \Sigma_\mu \lambda_\mu |\psi_\mu\rangle\langle\psi_\mu|$, where $\lambda_\mu \geq 0$ and $\Sigma_\mu \lambda_\mu = 1$, one form of the Kraus operators representing the stabilizing quantum channel is $\{K_i^\mu = \sqrt{\lambda_\mu}|\psi_\mu\rangle\langle i|\}$, where $|i\rangle$ are basis vectors of the Hilbert space of the qudit. Contrary to the conventional approaches discussed in the previous paragraph, this dissipative map bundles the cooling and state preparation steps and pumps an arbitrary state into the target state $\sigma$. In the case where the target state is pure, this quantum channel reduces to the "measure and rotate" procedure. Depending on the purity of the target state, entropy can be extracted from or injected into the system using the ancilla qubit. If a quantum circuit for this quantum channel is constructed using the techniques of the present application is implemented repeatedly, state stabilization can be achieved. In some embodiments, this allows a nonclassical resource state to be kept alive in a noisy quantum memory.

A second application of the generalized quantum channel construction technique described herein is in quantum error correction (QEC). In this application, multiple steady quantum states or even a subspace of steady states may be stabilized. The multiple quantum states which may be used to encode useful classical or quantum information. In some embodiments, using subspaces of steady states for QEC may include implementing a recovery map of QEC. Due to ubiquitous coupling between the qudit and the environment of the qudit, the quantum information initially stored in the qudit will unavoidably decohere as the qudit becomes entangled with the environment. Conventional QEC schemes encode quantum information in some carefully chosen logical subspaces and use syndrome measurement and conditional recovery operations to actively decouple the qudit from the environment. Despite the variety of QEC codes and recovery schemes, the operation of any QEC recovery can always be identified as a quantum channel.

For qubit-based stabilizer codes with $N_s$ stabilizer generators, the recovery is a CPTP map with Kraus rank $2^{N_s}$. In some embodiments, the ancilla qubit may be used to sequentially measure all $N_s$ stabilizer generators to extract the syndrome, and finally perform a correction unitary operation conditioned on the syndrome pattern. Since the stabilizer generators commute with each other, their ordering does not change the syndrome. Moreover, the stabilizer measurement does not require conditioning on previous measurement outcomes, because the unitary operation at the l-th round is simply:

$$U_b(l) = U_l \cdot P_+ \otimes \hat{S}_l + P_- \otimes I, \qquad \text{(Eqn. 22)}$$

with $\hat{S}_l$ for the l-th stabilizer and $P_\pm = \frac{1}{2}(|g\rangle \pm |e\rangle)(\langle g| + \langle e|)$, which is independent of the previous measurement outcomes $b^{(l-1)}$. Finally, the correction unitary operation $U_{b^{(N_s)}}$ is performed, conditioned on the syndrome $b^{(N_s)}$.

In some embodiments, QEC codes that fulfill the quantum error-correction conditions associated with a set of error operations may be used. For these QEC codes, the Kraus representation of the QEC recovery map may be obtained and efficiently implemented with the construction of general quantum channels described herein. In a particular non-limiting example, a QEC code known as the binomial code uses the larger Hilbert space of higher excitations to correct excitation loss errors in bosonic systems. In order to correct up to two excitation losses, the binomial code encodes the two logical basis states as:

$$|W_\uparrow\rangle \equiv \frac{|0\rangle + \sqrt{3}|6\rangle}{2}, \qquad \text{(Eqn. 23)}$$

$$|W_\downarrow\rangle \equiv \frac{\sqrt{3}|3\rangle + |9\rangle}{2}.$$

For small loss probability $\gamma$ for each excitation, this encoding scheme can correct errors up to $O(\gamma^2)$, which includes the following four relevant processes: identity evolution ($\hat{I}$), losing one excitation ($\hat{a}$), losing two excitations ($\hat{a}^2$), and back-action induced dephasing ($\hat{n}$). Based on the Kraus representation of the QEC recovery (with Kraus rank 4), the following set of unitary operations $U_{b^{(l)}}$ is obtained for the construction of the QEC recovery channel with an adaptive quantum circuit:

$$\tilde{U}_\emptyset = \begin{pmatrix} \hat{P}_3 \\ \hat{I} - \hat{P}_3 \end{pmatrix}, \qquad \text{(Eqn. 24)}$$

$$\tilde{U}_0 = \begin{pmatrix} \hat{P}_W \\ \hat{I} - \hat{P}_W \end{pmatrix}, \quad \tilde{U}_1 = \begin{pmatrix} \hat{P}_1 \\ \hat{I} - \hat{P}_1 \end{pmatrix},$$

$$\tilde{U}_{00} = \begin{pmatrix} \hat{I} \\ \hat{0} \end{pmatrix}, \quad \tilde{U}_{01} = \begin{pmatrix} U_{\hat{n}} \\ \hat{0} \end{pmatrix},$$

$$\tilde{U}_{10} = \begin{pmatrix} U_{\hat{a}} \\ \hat{0} \end{pmatrix}, \quad \tilde{U}_{11} = \begin{pmatrix} U_{\hat{a}^2} \\ \hat{0} \end{pmatrix},$$

where the projection are defined as $\hat{P}_i \equiv \Sigma_k |3k+i\rangle\langle 3k+i|$ and $\hat{P}_W \equiv |W_\uparrow\rangle\langle W_\uparrow| + |W_\downarrow\rangle\langle W_\downarrow|$, and the unitary operators $U_{\hat{O}}$ (where $\hat{O} = \hat{a}, \hat{a}^2, \hat{n}$) transform the error states $\hat{O}|W_\sigma\rangle$ back to $|W_\sigma\rangle$ for $\sigma = \uparrow, \downarrow$. In other words:

$$U_O = \sum_\sigma |W_\sigma\rangle \frac{\langle W_\sigma|\hat{O}^\dagger}{\sqrt{\langle W_\sigma|O^\dagger O|W_\sigma\rangle}} + U^\perp, \qquad \text{(Eqn. 25)}$$

where $U^\perp$ is an isometry that takes the complement of the syndrome subspace to the complement of the logical subspace. In some embodiments, the first two rounds of operations, projective measurements are performed to extract the error syndrome. In the last round, a correction unitary operation is applied to restore the logical states. For example, if the measurement outcome $b^{(2)} = (0,0)$, there is no error and the identify operation ($\hat{I}$) is sufficient. If $b^{(2)} = (0,1)$, there is back-action induced dephasing error, which changes the coefficients of Fock states so we need to correct for that with $U_{\bar{n}}$. If $b^{(2)}=(1,1)$, there is a single excitation loss, which can be corrected with $U_{\hat{a}}$. If $b^{(2)}=(1,0)$, there are two excitation losses, which can be fully corrected with $U_{\hat{a}^2}$. Repetitive application of the above QEC recovery channel can stabilize the system in the code space spanned by $|W_\uparrow\rangle$ and $|W_\downarrow\rangle$. Note that for more complicated QEC codes (e.g. GKP code [GKP_PRA_2001]) and the QEC In some embodiments, the QEC application may implement approximate QEC codes, which can also efficiently correct errors but only approximately fulfill the QEC criterion. For approximate QEC codes, it is challenging to analytically obtain the optimal QEC recovery map, but one can use semi-definite programming to numerically optimize the entanglement fidelity and obtain the optimal QEC recovery map. Alternatively one can use the transpose channel or quadratic recovery channels which are known to be near-optimal. All these recovery channels can be efficiently implemented using the general construction of CPTP maps described herein.

In another application of the techniques described here, the construction of generalized quantum channels can be further extended if the intermediate measurement outcomes are part of the output together with the state of the quantum system, which leads to an interesting class of quantum channels called a quantum instrument (QI). QIs enable the tracking of both the classical measurement outcome and the post-measurement state of the qudit. In some embodiments, the quantum instrument has the following CPTP map:

$$\rho \mapsto \varepsilon_{QI}(\rho) = \sum_{\mu=1}^{M} \varepsilon_\mu(\rho) \otimes |\mu\rangle\langle\mu|, \quad \text{(Eqn. 26)}$$

where $|\mu\rangle\langle\mu|$ are orthogonal projections of the measurement device with M classical outcomes, $\xi_\mu$ are completely positive trace non-increasing maps, and $\Sigma_{\mu=1}^{M}\xi_\mu(\rho)$ preserves the trace. Note that $\xi_\mu(\rho)$ gives the post-measurement state associated with outcome $\mu$.

In some embodiments, the QI is implemented as follows. (1) Find the minimum Kraus representation for $\xi_\mu(\rho)$ (each with rank $J_\mu$) with Kraus operators $K_{\mu,j}$ for $j=1, 2, \ldots, J_\mu$. (2) Introduce binary labeling of these Kraus operators, $K_{\vec{b}^{(L)}}$ where the binary label has length $L=L_1+L_2$, with the first $L_1=\lceil\log_2 M\rceil$ to encode $\mu$ and the remaining first $L_2=\lceil\log_2 \max_\mu(J_\mu)\rceil$ bits to encode j (padding with zero operators to make a total of $2^L$ Kraus operators). (3) Use the quantum circuit with L rounds of adaptive evolution and ancilla measurement. (4) Output the final state of the quantum system as well as $b^{(L_1)}$ that encodes $\mu$ associated with the M possible classical outcomes. In this way, the arbitrary QI described in Eq. 25 is constructed. In some embodiments, the QI is a used to implement complicated conditional evolution of the system. In some embodiments, the QI is a used for quantum information processing tasks that require measurement and adaptive control.

In some embodiments, the qudit is not included in the QU output. In such embodiment, the quantum channel that is constructed is effectively a positive operator valued measure (POVM), which is also referred to as a generalized quantum measurement. A POVM is a CPTP map from the quantum state of the system to the classical state of the measurement device, as represented by:

$$\rho \mapsto \varepsilon_{POVM}(\rho) = \sum_{\mu=1}^{M} Tr[\Pi_\mu \rho]|\mu\rangle\langle\mu|, \quad \text{(Eqn. 27)}$$

which is characterized by a set of Hermitian positive semi-definite operators $\{\Pi_\mu\}_{\mu=1}^{M}$ that sum to the identify operator. In some embodiments, the positive semidefinite $\Pi_\mu$ is decomposed as $\Pi_\mu=\Sigma_j K_{\mu,j}^\dagger K_{\mu,j}$ with a set of Kraus operators $$\{K_{\mu,j}\}_{j=1,\ldots,J_\mu}.$$

Thus, in some embodiments, the quantum circuit for the quantum instrument also implements the POVM if the qudit state is removed from the QI output. In some embodiments, this reduces the binary tree construction scheme of a POVM.

In some embodiments, a POVM is used for quantum state discrimination. It is impossible for any detector to perfectly discriminate a set of non-orthogonal quantum states. An optimal detector can achieve the so-called Hellstrom bound, however, by properly designing a POVM to optimize the discrimination between the non-orthogonal state. For example, in optical communication, quadrature phase shift keying uses four coherent states with different phases to send two classical bits of information. Using the techniques for quantum channel construction described herein, an optimized POVM may be constructed.

Figure 10:
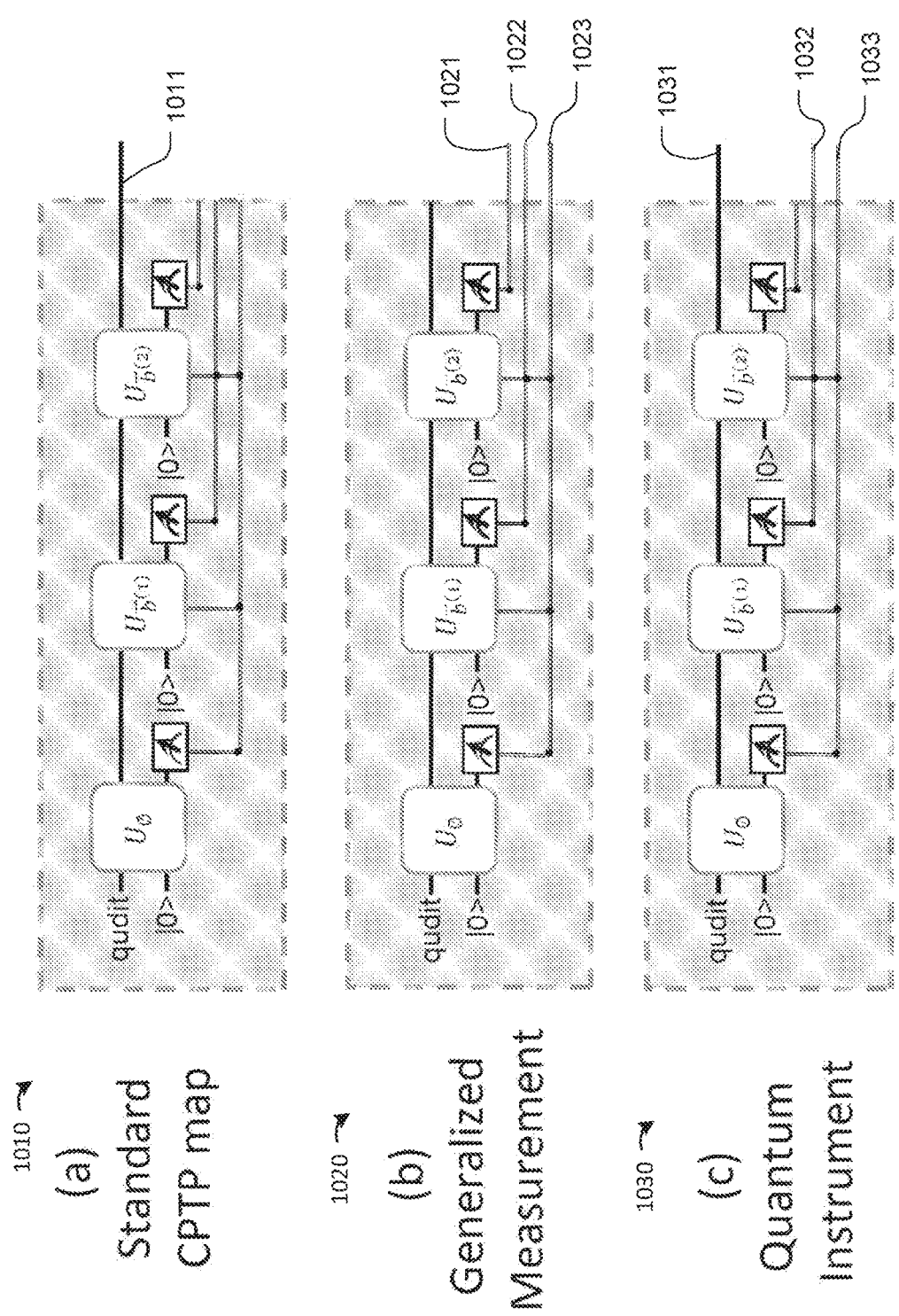
FIG. 10 is a block diagram of different types of quantum channels classified by their outputs.

Summarizing the above application, there are three different classifications of CPTP maps based on the output of the map, which are illustrated in FIG. 10: (a) a standard quantum channel 1010 with the quantum system (e.g., qudit 1011) as the output and all detection results from the measurement of the ancilla qubit are discarded; (b) a POVM 1020 with the classical measurement outcomes 1021-1023 as the output and the quantum system discarded; and (c) a QI with both the quantum system 1031 and at least a portion of the classical measurement outcomes 1032-1033 for the output. In some embodiments, the QI keeps both the post-measurement state of the system and the outcome encoded by the first $L_1$ bits of the ancilla measurement record. The remaining $L_2$ bits of the measurement record are discarded. In the QI 1030 of FIG. 10, $L_1=2$ and $L_2=1$. In principle, all three situations can be reduced to the standard quantum channel with an expanded quantum system that includes an additional measurement device to keep track of the classical measurement outcomes. In some embodiments, however, it is more resource efficient to use a classical memory for classical measurement outcomes, so that the quantum system does not expand unnecessarily and become overly complex.

Other Considerations

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A quantum information system comprising:
an ancilla qubit;
a qudit coupled to the ancilla qubit;
a detector configured to generate a detection result based on a quantum state of the ancilla qubit;
a driving source coupled to the qudit and the ancilla qubit and configured to apply at least one qudit driving signal to the qudit based on the detection result and at least one qubit driving signal to the qudit based on the detection result; and
a controller coupled to the driving source and the detector and configured to:
obtain an indication of a desired quantum channel;
receive, from the detector, a detection signal indicative of the detection result;
determine the at least one qudit driving signal based on the indication of the desired quantum channel;
determine the at least one qubit driving signal based on the indication of the desired quantum channel;
control the driving source to drive the qudit with the at least one qudit driving signal; and
control the driving source to drive the qubit with the at least one qubit driving signal.

2. The quantum information system of claim 1, wherein the indication of the desired quantum channel comprises a plurality of Kraus operators that form a minimal Kraus representation of the desired quantum channel.

3. The quantum information system of claim 2, wherein obtaining the indication of the desired quantum channel comprises determining the plurality of Kraus operators that form the minimal Kraus representation of the desired channel from one or more other operators.

4. The quantum information system of claim 3, wherein the controller is further configured to:
determine a plurality of joint unitary operators, each of the plurality of joint unitary operators configured to act on a joint system comprising the ancilla qubit and the qudit; and
create a binary tree structure associated with the plurality of unitary operators.

5. The quantum information system of claim 4, wherein the controller is further configured to determine each of the plurality of joint unitary operators based on a diagonalization of the sum of a subset of the plurality of Kraus operators that are rooted from an associated node of the binary tree structure.

6. The quantum information system of claim 5, wherein the controller is further configured to:
determine a first qudit unitary operator, a second qudit unitary operator and a qubit unitary operator associated with and based on each of the plurality of joint unitary operators;

determine the at least one qudit driving signal based on the first qudit unitary operator and the second qudit unitary operator; and determine the at least one qubit driving signal based on the qubit unitary operator.

7. The quantum information system of claim 1, wherein the ancilla qubit comprises a transmon qubit.

8. The quantum information system of claim 1, wherein the qudit comprises a quantum oscillator comprising electromagnetic radiation in a cavity.

9. A method of operating a quantum information system that includes a qudit coupled to an ancilla qubit forming a qudit-qubit system, the method comprising:

applying a first unitary operation to the qudit-qubit system;

generating a detection result based on a quantum state of the ancilla qubit;

applying a second unitary operation to the qudit-qubit system based on the detection result;

obtaining an indication of a desired quantum channel;

determining at least one qudit driving signal based on the indication of the desired quantum channel; and determining at least one qubit driving signal based on the indication of the desired quantum channel.

10. The method of claim 9, wherein the indication of the desired quantum channel comprises a plurality of Kraus operators that form a minimal Kraus representation of the desired quantum channel.

11. The method of claim 10, wherein obtaining the indication of the desired quantum channel comprises determining the plurality of Kraus operators that form the minimal Kraus representation of the desired channel from one or more other operators.

12. The method of claim 11, further comprising determining a plurality of joint unitary operators, each of the plurality of joint unitary operators configured to act on a joint system comprising the ancilla qubit and the qudit; and determining a binary tree structure associated with the plurality of unitary operators.

13. The method of claim 12, further comprising determining each of the plurality of joint unitary operators based on a diagonalization of the sum of a subset of the plurality of Kraus operators that are rooted from an associated node of the binary tree structure.

14. The method of claim 13, further comprising:

determining a first qudit unitary operator, a second qudit unitary operator and a qubit unitary operator associated with and based on each of the plurality of joint unitary operators;

determining the at least one qudit driving signal based on the first qudit unitary operator and the second qudit unitary operator; and determining the at least one qubit driving signal based on the qubit unitary operator.

15. At least one non-transitory storage medium encoded with executable instructions that, when executed by at least one processor, cause the at least one processor to carry out a method of creating a generalized quantum channel, wherein the method comprises:

obtaining a plurality of Kraus operators associated with a desired quantum channel;

generating a plurality of unitary joint operations associated with a joint qudit-qubit system based on the Kraus operators;

determining a first unitary joint operation of a plurality of unitary joint operations to perform on the joint qudit-qubit system; and determining two unitary qudit-only operations and one unitary qubit-only operation based on the first unitary joint operation.

16. The at least one non-transitory storage medium of claim 15, wherein the method further comprises generating a binary tree structure associated with the plurality of unitary joint operations.

17. The at least one non-transitory storage medium of claim 16, wherein each node of the binary tree structure is associated with a respective unitary joint operation of the plurality of unitary joint operations.

18. The at least one non-transitory storage medium of claim 17, wherein each leaf of the binary tree structure is associated with a Kraus operator of the desired quantum channel.

* * * * *